(12) United States Patent
Sugawara et al.

(10) Patent No.: US 7,713,607 B2
(45) Date of Patent: *May 11, 2010

(54) LASER-WELDED ARTICLE OF LASER-TRANSMISSIBLE WORKPIECE INCLUDING ALKALINE EARTH METAL SALT OF ANTHRAQUINONE ACIDIC DYE

(75) Inventors: Syuuji Sugawara, Neyagawa (JP); Yoshiteru Hatase, Neyagawa (JP); Toshihiro Okanishi, Neyagawa (JP)

(73) Assignee: Orient Chemical Industries, Ltd., Osaka-shi (JP)

( * ) Notice: Subject to any disclaimer, the term of this patent is extended or adjusted under 35 U.S.C. 154(b) by 349 days.

This patent is subject to a terminal disclaimer.

(21) Appl. No.: 11/794,122

(22) PCT Filed: Feb. 7, 2006

(86) PCT No.: PCT/JP2006/302429

§ 371 (c)(1),
(2), (4) Date: Jun. 26, 2007

(87) PCT Pub. No.: WO2006/085643

PCT Pub. Date: Aug. 17, 2006

(65) Prior Publication Data

US 2007/0292651 A1    Dec. 20, 2007

(30) Foreign Application Priority Data

Feb. 9, 2005  (JP) .............................. 2005-033648

(51) Int. Cl.
   *B32B 3/10*   (2006.01)
   *B32B 37/04*  (2006.01)
(52) U.S. Cl. .................. 428/57; 524/358; 156/272.8
(58) Field of Classification Search ................... 428/57; 524/358; 156/272.8
   See application file for complete search history.

(56) References Cited

U.S. PATENT DOCUMENTS

| 4,902,798 | A | 2/1990 | Nakamatsu et al. |
| 5,367,075 | A | 11/1994 | Nakamatsu et al. |
| 2003/0039837 | A1* | 2/2003 | Koshida et al. .......... 428/411.1 |
| 2003/0065074 | A1 | 4/2003 | Koshida et al. |
| 2003/0125429 | A1* | 7/2003 | Joachimi et al. ............. 524/105 |
| 2004/0110880 | A1* | 6/2004 | Sugawara et al. ........... 524/155 |
| 2004/0144483 | A1* | 7/2004 | Sugawara et al. ........ 156/272.8 |
| 2005/0003301 | A1 | 1/2005 | Sugawara et al. |
| 2005/0081991 | A1 | 4/2005 | Hatase et al. |

FOREIGN PATENT DOCUMENTS

| JP | A 11-170371 | 6/1999 |
| JP | A 2000-309694 | 11/2000 |
| JP | A 2002-228830 | 8/2002 |
| JP | A-2002-228831 | 8/2002 |
| WO | WO 2004/067619 A1 | 8/2004 |
| WO | WO 2004/072175 A1 | 8/2004 |

OTHER PUBLICATIONS

U.S. Office Action for corresponding U.S. Appl. No. 11/794,144 dated Dec. 23, 2009.
Action for corresponding U.S. Appl. No. 11/794,144 dated Jul. 9, 2009.
U.S. Office Action for corresponding U.S. Appl. No. 11/794,144 dated Mar. 23, 2009.
International Search Report for corresponding U.S. Appl. No. 11/794,144 dated Apr. 18, 2006.

* cited by examiner

*Primary Examiner*—Alexander Thomas
(74) *Attorney, Agent, or Firm*—Oliff & Berridge, PLC

(57) ABSTRACT

A laser-welded article comprises:
   a laser-transmissible workpiece made from a laser-transmissible colored resin composition including at least a thermoplastic resin and an alkaline earth metal salt of an anthraquinone-type acidic dye represented by the following chemical formulae (1) and/or (2)

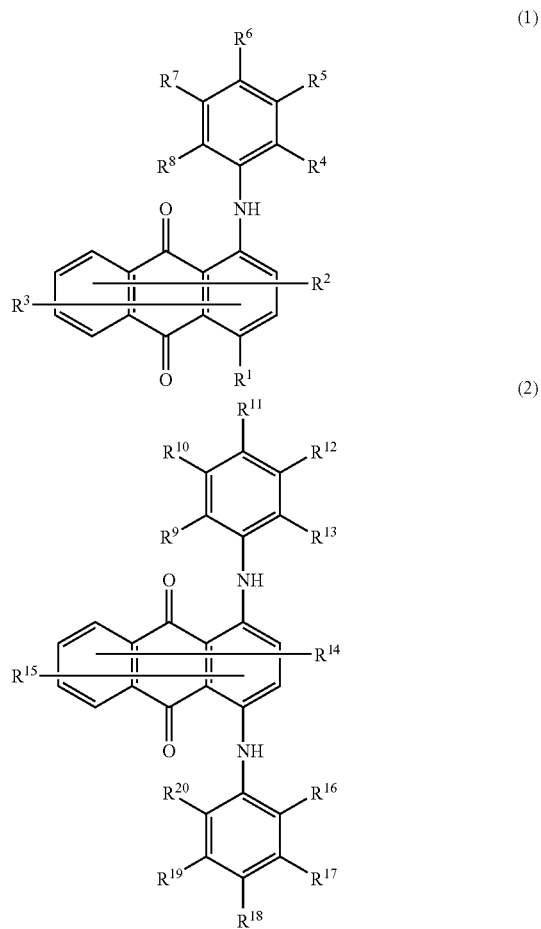
(1)
(2)
and a laser-absorptive workpiece putting the laser-transmissible workpiece together,
wherein the workpieces are welded at the put position thereof by irradiated laser towards the laser-transmissible workpiece that transmits therethrough and is absorbed into the laser-absorptive workpiece.
11 Claims, 2 Drawing Sheets

LASER-WELDED ARTICLE OF LASER-TRANSMISSIBLE WORKPIECE INCLUDING ALKALINE EARTH METAL SALT OF ANTHRAQUINONE ACIDIC DYE

TECHNICAL FIELD

This invention relates to a laser-welded article of a laser-absorptive workpiece and a laser-transmissible workpiece made from a laser-transmissible colored resin composition including an alkaline earth metal salt of an anthraquinone-type acidic dye. And the invention relates to a method for laser welding thereof.

BACKGROUND OF THE INVENTION

For joining mutually workpieces made from a synthetic thermoplastic resin material, a method for laser welding is known.

Such the laser welding is executed for example as follows. As shown in FIG. 1, a workpiece made from a laser-transmissible material and another workpiece made from a laser-absorptive material are put together. Laser is irradiated from the laser-transmissible workpiece side towards the laser-absorptive workpiece side. The laser transmitted through the laser-transmissible workpiece, is absorbed into the laser-absorptive workpiece and causes the exothermic. The laser-absorptive workpiece at a laser-absorbing neighborhood is melted by the exothermic. Then it melts the laser-transmissible workpiece, to weld both workpieces. After cooling, the laser-transmissible workpiece and the laser-absorptive workpiece are firmly joined with sufficient welding strength.

The following merits of the laser welding are mentioned. They are feasibility of the welding without contact of a laser beam source and the workpieces being due to weld; little thermal influence of periphery by the local exothermic; no threat of mechanical vibration; feasibility of the welding of the precise workpieces or the three-dimensional or complicated workpieces for themselves; superior reproducibility; maintaining of sufficient airtightness; great welding strength; difficulty of recognizing a boundary line of the welding by visual observation; no generation of dust and so on.

The laser welding is executed by simple operation for joining certainly. The laser welding achieves equal or more joining strength, as compared with prior joining of resin workpieces for example clamping by clamps such as bolts, screws and clips, bonding by a bonding agent, vibration welding, ultrasonic welding. Also it achieves labor saving, improving of productivity, and decreasing of working cost, because of little thermal or vibratory influence. So the laser welding is applied to joining of functional workpieces or electric workpieces that is due to avoid the thermal or vibratory influence under an automobile industry and an electric or electronic industry. And the laser welding is adapted to joining of resin workpieces having an intricate shape.

As a prior art of the laser welding in Japanese Patent Provisional Publication No. 11-170371, a method for the laser welding is mentioned. The method comprises a step that an opaque workpiece made from a laser-absorptive synthetic thermoplastic resin and a colorless transparent workpiece made from a laser-transmissible synthetic thermoplastic resin are put together, and then the laser is irradiated in focus at a put portion thereof together. When the welded portion is watched from a side of the colorless transparent workpiece, the welded portion and a non-welded portion differ in color and smoothness and look unattractive.

In Japanese Patent Provisional Publication No. 2000-309694, anthraquinone-type dyes as colorant for a laser-transmissible colored thermoplastic resin composition are mentioned. If the composition is preserved for a long-term, the colorant would be sublimed. Then color tone thereof fades out from the workpiece made from the composition. Therefore the welded position looks unattractive.

It is desired that a laser-transmissible colored thermoplastic resin composition does not cause fading out a hue under a thermal treatment procedure before the laser welding, does not cause sublimation of colorant in the composition, and has sufficient laser-transmissible property. Furthermore it is important that the colorant in the laser-transmissible colored thermoplastic resin composition has sufficient heat resistance and fastness, because the prepared laser-welded article must not sublime the colorant and must not fade the color tone out under stark exposure atmosphere such as high temperature and high humidity.

SUMMARY OF THE INVENTION

The present invention has been developed to solve the foregoing problems.

It is an object of the present invention to provide a laser-transmissible colored resin composition including an alkaline earth metal salt of an anthraquinone-type acidic dye that does not cause fading out a hue of laser-transmissible workpieces made from a colored synthetic thermoplastic resin under preparing procedures of the workpieces or a thermal treatment procedure before laser welding thereof, does not virtually cause sublimation of colorant, and has excellent stability of long-term preservation and a sufficient laser-transmissible property for laser welding.

It is a second object of the present invention to provide a laser-welded article having heat resistance and fastness that a laser-transmissible workpiece having sufficient laser-transmittance made from the composition and a laser-absorptive workpiece are welded by laser.

It is a third object of the present invention to provide a method for laser welding that the prepared article is joined strongly without burnout on surface of the laser-transmissible workpiece.

A laser-welded article of the present invention developed for accomplishing the foregoing objects comprises a laser-transmissible workpiece including an alkaline earth metal salt of an anthraquinone-type acidic dye.

The laser-welded article of the present invention comprises: a laser-transmissible workpiece made from a laser-transmissible colored resin composition including an alkaline earth metal salt of an anthraquinone-type acidic dye and a thermoplastic resin, and a laser-absorptive workpiece putting the laser-transmissible workpiece together, wherein the workpieces are welded at a put position thereof by irradiated laser towards the laser-transmissible workpiece that transmits therethrough and is absorbed into the laser-absorptive workpiece.

It is preferable that the alkaline earth metal salt of the anthraquinone-type acidic dye is represented by the following chemical formula (1)

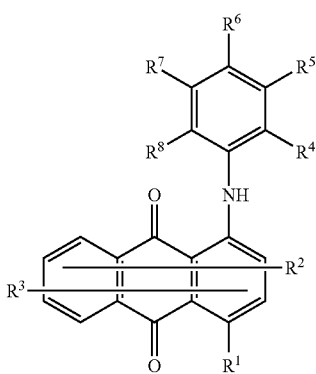

(1)

[in the chemical formula (1), $R^1$ is selected from the group consisting of a hydrogen atom, a hydroxyl group, an amino group, an alkylamino group, and an acylamino group, $R^2$ is selected from the group consisting of a hydrogen atom, an alkyl group, a halogen group, an alkoxyl group and $SO_3M_{1/2}$ that M is an alkaline earth metal, $R^3$ is same or different to $R^2$, and is selected from the group consisting of a hydrogen atom, an alkyl group, a halogen group, an alkoxyl group and $SO_3M_{1/2}$ that M is an alkaline earth metal, and an anilino group having no substitutional groups or substitutional groups of an alkyl group, a halogen group, an amino group, a nitro group or $SO_3M_{1/2}$ that M is an alkaline earth metal, $R^4$, $R^5$, $R^6$, $R^7$ and $R^8$ are same or different to each other, and are selected from the group consisting of a hydrogen atom, an alkyl group, an amino group, a nitro group, an acyl group, an acylamino group, an acyl-N-alkylamino group, a halogen group, an alkoxyl group and $SO_3M_{1/2}$ that M is an alkaline earth metal, and at least one of $R^2$, $R^3$, $R^4$, $R^5$, $R^6$, $R^7$ and $R^8$ is $SO_3M_{1/2}$].

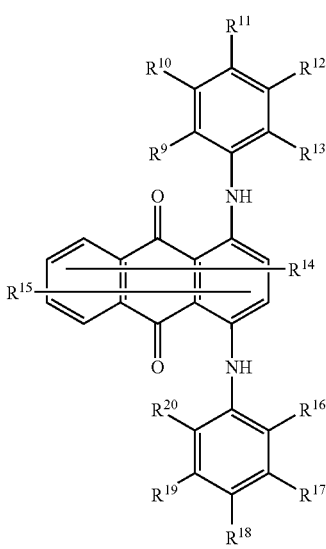

(2)

[in the chemical formula (2), $R^{14}$ and $R^{15}$ are same or different to each other, and are selected from the group consisting of a hydrogen atom, an alkyl group, a halogen group, an alkoxyl group an amino group, a nitro group, and $SO_3M_{1/2}$ that M is an alkaline earth metal, $R^9$, $R^{10}$, $R^{11}$, $R^{12}$, $R^{13}$, $R^{16}$, $R^{17}$, $R^{18}$, $R^{19}$, and $R^{20}$ are same or different to each other, and are selected from the group consisting of a hydrogen atom, an alkyl group, an acyl group, an acylamino group, an acyl-N-alkylamino group, a halogen group, an alkoxyl group and $SO_3M_{1/2}$ that M is an alkaline earth metal, and at least one of $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ is $SO_3M_{1/2}$].

And a method for laser welding of the present invention comprises:

putting a laser-transmissible workpiece made from a laser-transmissible colored resin composition including an alkaline earth metal salt of an anthraquinone-type acidic dye preferably represented by the above-mentioned chemical formulae (1) and/or (2) onto a laser-absorptive workpiece, irradiating laser with scanning towards the laser-transmissible workpiece, and welding the laser-transmissible workpiece and the laser-absorptive workpiece at a put portion thereof together by the laser that transmits through the laser-transmissible workpiece and is absorbed into the laser-absorptive workpiece.

In the method for the laser welding, it is preferable that the laser furnishes an energy quantity x(J/mm) that is satisfied the following numerical expression $$5.0 \geq x = (p \times T) \div (100 \times q) \geq 0.4$$

[in the numerical expression, p(W) is output power of the laser, q(mm/sec.) is scanning speed of the laser, T is transmissivity of the laser-transmissible workpiece under wavelength of the laser]. The method causes excellent coordination of practically sufficient welding strength of the laser-welded article and the pretty surface or appearance thereof.

The laser-transmissible colored resin composition of the present invention includes at least the alkaline earth metal salt of the anthraquinone-type acidic dye represented by the chemical formulae (1) or (2) and the thermoplastic resin, and preferably laser-transmissivity of 940 nm of wavelength in the colored laser-transmissible composition represented by $T_1$ is at least 15%.

And it is preferable that the thermoplastic resin used in the laser-transmissible colored resin composition including the alkaline earth metal salt of the anthraquinone-type acidic dye is polyphenylene sulfide resin. The laser-transmissible colored resin composition including the polyphenylene sulfide resin and the alkaline earth metal salt of the anthraquinone-type acidic dye represented by the above-mentioned chemical formula (1) and/or (2) by blending causes the sufficient heat resistance and fastness under a preparing procedure of the laser-transmissible workpiece around high melting point of the polyphenylene sulfide resin, a thermal treatment procedure before the laser welding thereof, or a welding procedure by the laser. Therefore the composition is used for manufacturing the laser-welded article exposed to not only mild atmosphere but also stark atmosphere such as high temperature and high humidity.

The laser-welded article of the laser-transmissible workpiece made from the laser-transmissible colored resin composition including the alkaline earth metal salt of the anthraquinone-type acidic dye of the present invention can be manufactured by the laser welding under extensive conditions. It is caused by the sufficient laser-transmittance of the laser-transmissible colored resin composition, an excellent laser welding property and stability thereof. Furthermore it is feasible to be welded by the laser with uneven complicated workpieces themselves. And the laser-welded article is distinguished for the pretty appearance, the welding property such as the sufficient tensile strength and so on.

The laser-transmissible colored resin composition of the present invention has a sufficient laser-transmissible property of the laser ranging from approximate 800 nm of wavelength by semiconductor laser to approximate 1200 nm of wavelength by yttrium aluminum garnet (YAG) laser. And the laser-transmissible colored resin composition has excellent durability such as heat resistance and light resistance, excellent migration resistance, excellent chemical resistance, and gives a vivid hue. Therefore the resin composition is appropriate for the method for the laser welding.

According to the method for the laser welding of the present invention, the laser is irradiated with the scanning in order to transmit through the laser-transmissible workpiece made from the laser-transmissible colored resin composition including the alkaline earth metal salt of the anthraquinone-type acidic dye, and in order to be absorbed into the laser-absorptive workpiece at the put portion thereof. The irradiated laser reaches the laser-absorptive workpiece, to cause the exothermic. Then both of the workpieces are melted by the exothermic to weld firmly at the put position thereof together.

DETAILED EXPLANATION OF THE INVENTION

Hereunder embodiments of the present invention are mentioned in detail. Certainly it is not to be construed to limit them in the present invention.

The laser-welded article of the present invention comprises the laser-transmissible workpiece including the alkaline earth metal salt of the anthraquinone-type acidic dye and the laser-absorptive workpiece including the laser-absorbent anywise, which are welded together. Another laser-welded article of the present invention comprises the laser-absorptive workpiece of a film layer including a laser-absorbent or a coating layer including a laser-absorbent between the plural laser-transmissible workpieces, which are welded together.

The laser-transmissible workpieces are made from the resin composition that is prepared by blending of the alkaline earth metal salt of the anthraquinone-type acidic dye, the thermoplastic resin in any rate, and various supplementary additive agents if necessary, to mold.

On the other hand, the laser-absorptive workpiece has the laser-absorptive layer that comes in contact with the laser-transmissible workpiece anywise. An example of the laser-absorptive workpiece is a single layer of a plate-workpiece that is made from the laser-absorptive colored resin composition including the laser-absorbent to mold thickly. Another example thereof is the laser-absorptive workpiece which the film layer including the laser-absorbent or the coating layer including the laser-absorbent intervenes between the plural laser-transmissible workpieces, which are combined to unify with the plural layers.

The laser-welded article of the present invention may be manufactured by single or plural irradiation of the laser. Example of the laser-welded article manufactured by the plural irradiation of the laser is the laser-welded article consisting of the laser-absorptive workpiece between the plural laser-transmissible workpieces that are piled up over and over and welded. When the laser-absorptive workpiece is thin, it can be firmly welded by the single irradiation of the laser for the welding from both sides of the exterior laser-transmissible workpiece simultaneously. When the laser-absorptive workpiece is thick, it should be welded by the plural irradiation of the laser for the welding from both sides of the exterior laser-transmissible workpiece, simultaneously, one by one, or repetitiously if necessary.

Concrete embodiments of the manufacture process for the laser-welded article are explained as showing Figs.

Figure 1:
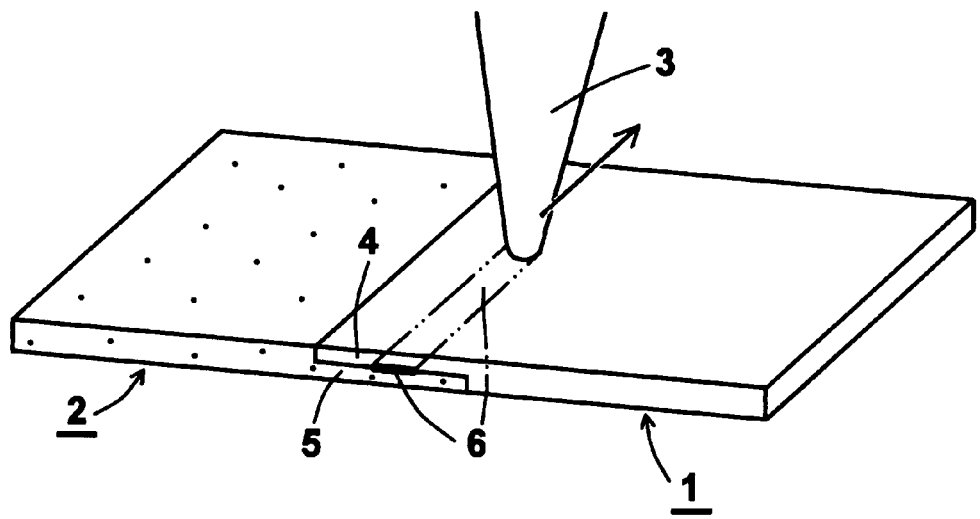
FIG. 1 shows the method for the laser welding of the present invention of both of the laser-transmissible workpiece made from the laser-transmissible colored resin composition and the laser-absorptive workpiece on its way.

When it is manufactured as shown FIG. 1, the processes thereof consist of the following (A) to (E).

(A) The laser-transmissible workpiece 1 made from the laser-transmissible colored resin composition including at least the alkaline earth metal salt of the anthraquinone-type acidic dye is molded.

(B) The laser-absorptive workpiece 2 is put together with the laser-transmissible workpiece 1.

(C) Then the laser 3 is irradiated towards the laser-transmissible workpiece 1 under the proper condition that the laser 3 transmits through the laser-transmissible workpiece 1, and is absorbed into the laser-absorptive workpiece 2.

(D) The irradiated laser 3 reaches to the laser-absorptive workpiece 2 and is absorbed by operation of the laser-absorbent into it, to cause the exothermic and then melt both workpieces 1 and 2 by the exothermic.

(E) The put position of the laser-transmissible workpiece 1 and the laser-absorptive workpiece 2 is welded at the welding position 6 thereof.

It is necessary that the laser-welded article welding with the laser-transmissible workpiece and the laser-absorptive workpiece has practically sufficient welding strength at the welding position. Therefore the tensile stress strength thereof in accordance with a tensile stress test of Japanese Industrial Standard K-7113-1995 is preferably 15 MPa or more and furthermore preferably ranging from 20 to 60 MPa.

Figure 2:
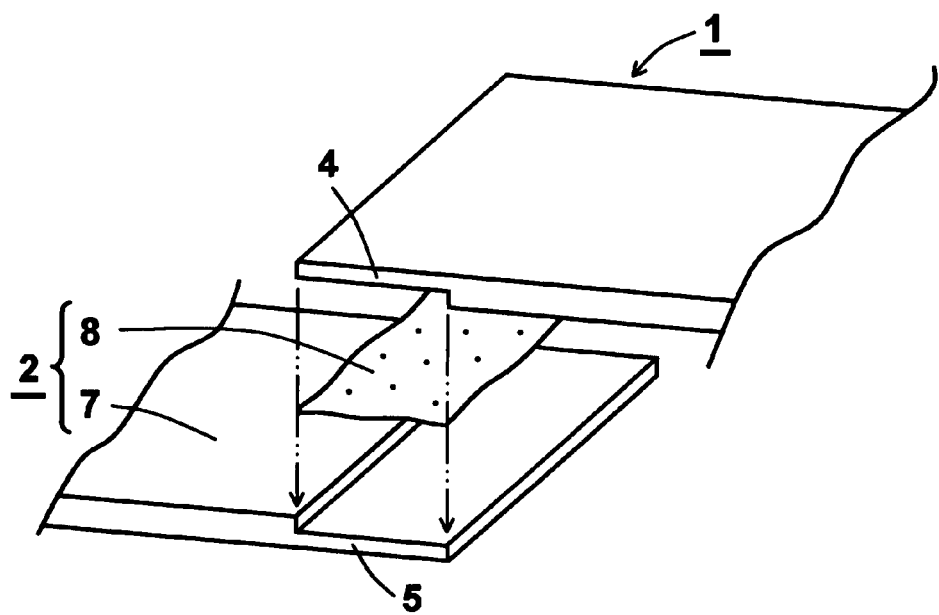
FIG. 2 shows another constitution of the laser-transmissible workpiece and the laser-absorptive workpiece in order to execute the method for the laser welding of the present invention.
Figure 3:
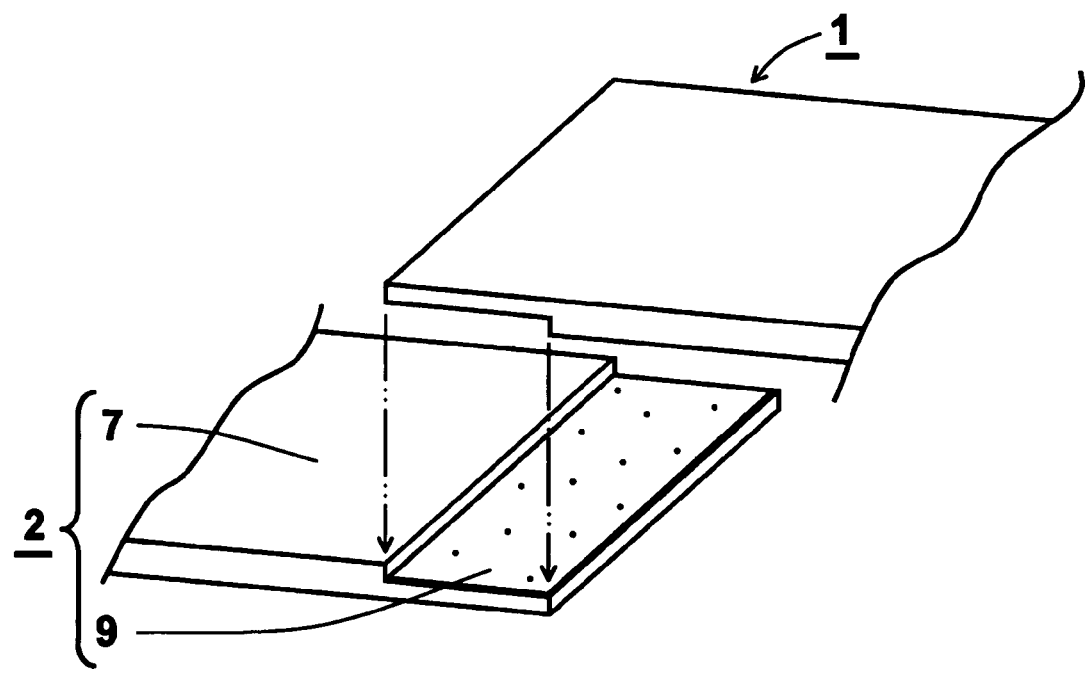
FIG. 3 shows another constitution of the laser-transmissible workpiece and the laser-absorptive workpiece in order to execute the method for the laser welding of the present invention.

When it is manufactured as shown in FIG. 2 or 3, the processes thereof consist of the following (F) to (J).

(F) The plural laser-transmissible molded workpieces 1 and 7 made from the laser-transmissible colored resin composition including at least the alkaline earth metal salt of the anthraquinone-type acidic dye are molded.

(G) The laser-absorptive workpiece of the layer 8 (or 9) including the laser-absorbent is intervened between the plural laser-transmissible molded workpieces 1 and 7.

As shown in illustrated FIG. 2 for a concrete mode, the laser-absorptive workpiece 2 may be beforehand made of the resin film layer 8 including the laser-absorbent and the laser-transmissible molded workpiece 7 before the laser welding, or may be simultaneously made thereof at the laser welding. As shown in FIG. 3, the laser-absorptive workpiece 2 may be made of the laser-transmissible molded workpiece 7 and the coating layer 9 applied thereto with ink and/or paint including the laser-absorbent.

(H) Then the lasers 3 is irradiated from plural sources under the proper condition that lasers 3 transmit through the laser-transmissible workpieces, and are absorbed into the laser-absorptive workpiece.

(I) The irradiated lasers 3 from the plural sources reach to the laser-absorptive workpiece 2 and are absorbed by operation of the laser-absorbent into it, to cause the exothermic and then melt all workpieces 1 and 2 by the exothermic.

(J) The laser-transmissible workpieces 1 and the laser-absorptive workpiece 2 are welded at the put position thereof.

On the welding procedure for the laser-welded article in (F) to (J), when the resin film layer 8 including the laser-absorbent and the coating layer 9 applying the ink and/or the paint including the laser-absorbent is a thin layer, the laser-transmissible workpiece 1, the laser-absorptive layer and the laser-transmissible molded workpiece 7 may be melted by irradiating the laser from one side at once to weld simultaneously. When the laser is irradiated from one side of the laser-transmissible workpiece 1, material of the laser-transmissible molded workpiece 7 may choose with no regard to the laser-transmittance thereof.

The tensile stress strength thereof in accordance with Japanese Industrial Standard K-7113-1995 is preferably 15 MPa or more and furthermore preferably ranging from 20 to 60 MPa as same as above-mentioned laser-welded article.

When the laser is irradiated for the laser welding as shown in FIGS. 2 and 3, the laser 3 may be irradiated from either upside or downside, simultaneously, one by one, or repetitiously.

Incidentally, examples of the laser-absorbent included in the laser-absorptive workpiece are carbon black, nigrosine, aniline black, phthalocyanine, naphthalocyanine, porphyrin, cyanine-type compound, perylene, quaterrylene, metal complex, azo dye, anthraquinone, square acid derivative, iminium dye and so on. Especially carbon black and/or nigrosine are preferable, because they are stable and available inexpensively.

The laser-transmissible colored resin composition of the present invention includes the alkaline earth metal salt of the anthraquinone-type acidic dye and the resin. The salt of the anthraquinone-type acidic dye included in the composition is represented by the above-mentioned chemical formula (1) or (2). Hereunder the details are mentioned.

The alkaline earth metal salt of the anthraquinone-type acidic dye consists of sulfone group in the structure of anthraquinone-type acidic dye and alkaline earth metal salt by binding ionic bond. Because of the structure, the alkaline earth metal salt of the anthraquinone-type acidic dye can achieve the effect of the present invention.

The anthraquinone-type acidic dye is presented by the chemical formula (1) and (2). As a matter of convenience, bonding state between the sulfone group and the alkaline earth metal salt which is combination of monovalent anion and bivalent cation is described $SO_3M_{1/2}$ that M is the alkaline earth metal in the chemical structure. Therefore, the cation that has the amount of $M_{1/2}$ can bind with acidic groups such as sulfone group and the other anion in the dye or other dyes.

In the chemical formula (1), $R^1$ is the hydrogen atom; the hydroxyl group; the amino group; the alkylamino group of which examples are alkylamino groups having 1 to 12 carbon atoms such as methylamino, ethylamino, propylamino, iso-propylamino, n-butylamino, tert-butylamino, n-pentylamino, iso-pentylamino, hexylamino, heptylamino, octylamino and so on; and the acylamino group of which examples are acylamino groups having 1 to 12 carbon atoms such as formylamino, acetylamino, propionylamino, butyrylamino, valerylamino pivaloyldmino, and so on, $R^2$ is the hydrogen atom; the alkyl group of which examples are alkyl groups having 1 to 12 carbon atoms such as methyl, ethyl, propyl, iso-propyl, n-butyl, tert-butyl, n-pentyl, iso-pentyl, hexyl, heptyl, octyl and so on; the halogen group of which examples are F, Cl, Br and so on; the alkoxyl group of which examples are alkoxyl groups having 1 to 8 carbon atoms such as methoxy, ethoxy, propoxy, butoxy and so on; and $SO_3M_{1/2}$ that M is the alkaline earth metal such as Be, Mg, Ca, Sr, Ba and so on, $R^3$ is same or different to $R^2$, and is the hydrogen atom; the alkyl group; the halogen group of which examples are F, Cl, Br and so on; the alkoxyl group of which examples are alkoxyl groups having 1 to 8 carbon atoms such as methoxy, ethoxy, propoxy, butoxy and so on; $SO_3M_{1/2}$ that M is the alkaline earth metal such as Be, Mg, Ca, Sr, Ba and so on; and an anilino group having no substitutional groups or the alkyl group of which examples are alkyl groups having 1 to 12 carbon atoms such as methyl, ethyl, propyl, iso-propyl, n-butyl, tert-butyl, n-pentyl, iso-pentyl, hexyl, heptyl, octyl and so on, the halogen group of which examples are F, Cl, Br and so on, the amino group, the nitro group, $SO_3M_{1/2}$, $R^4$, $R^5$, $R^6$, $R^7$ and $R^8$ are same or different to each other, and are the hydrogen atom; the alkyl group of which examples are alkyl groups having 1 to 12 carbon atoms such as methyl, ethyl, propyl, iso-propyl, n-butyl, tert-butyl, n-pentyl, iso-pentyl, hexyl, heptyl, octyl and so on; the amino group; the nitro group; the acyl group of which examples are acyl groups having 1 to 12 carbon atoms such as formyl, acetyl, propionyl, butyryl, valeryl pivaloyl and so on; the acylamino group of which examples are acylamino groups having 1 to 12 carbon atoms such as formylamino, acetylamino, propionylamino, butyrylamino, valerylamino pivaloylamino and so on; the acyl-N-alkylamino group of which examples are acyl-N-alkylamino groups having 1 to 12 carbon atoms such as acetyl-N-methylamino, acetyl-N-ethylamino, propionyl-N-methylamino, butyryl-N-methylamino and so on; the halogen group of which examples are F, Cl, Br and so on; the alkoxyl group of which examples are alkoxyl groups having 1 to 8 carbon atoms such as methoxy, ethoxy, propoxy, butoxy and so on; and $SO_3M_{1/2}$ that M is the alkaline earth metal such as Be, Mg, Ca, Sr, Ba and so on.

But at least one of $R^2$, $R^3$, $R^4$, $R^5$, $R^6$, $R^7$ and $R^8$ of the salt of the dye represented by the chemical formula (1) is $SO_3M_{1/2}$. In other words, the salt has at least one $SO_3M_{1/2}$ in its chemical structure.

In the chemical formula (2), $R^{14}$ and $R^{15}$ are same or different to each other. And $R^{14}$ and $R^{15}$ are the hydrogen atom; the alkyl group of which examples are alkyl groups having 1 to 12 carbon atoms such as methyl, ethyl, propyl, iso-propyl, n-butyl, tert-butyl, n-pentyl, iso-pentyl, hexyl, heptyl, octyl and so on; the halogen group of which examples are F, Cl, Br and so on; the alkoxyl group of which examples are alkoxyl groups having 1 to 12 carbon atoms such as methoxy, ethoxy, propoxy, butoxy, pentyloxy, hexyloxy and so on; the amino group; the nitro group; and $SO_3M_{1/2}$ that M is the alkaline earth metal such as Be, Mg, Ca, Sr, Ba and so on, $R^9$, $R^{10}$, $R^{11}$, $R^{12}$, $R^{13}$, $R^{16}$, $R^{17}$, $R^{18}$, $R^{19}$, and $R^{20}$ are same or different to each other and are the hydrogen atom; the alkyl group of which examples are alkyl groups having 1 to 12 carbon atoms such as methyl, ethyl, propyl, iso-propyl, n-butyl, tert-butyl, n-pentyl, iso-pentyl, hexyl, heptyl, octyl and so on; the acyl group of which examples are acyl groups having 1 to 12 carbon atoms such as formyl, acetyl, propionyl, butyryl, valeryl pivaloyl and so on; the acylamino group of which examples are acylamino groups having 1 to 12 carbon atoms such as formylamino, acetylamino, propionylamino, butyrylamino, valerylamino pivaloylamino and so on; the acyl-N-alkylamino group of which examples are acyl-N-amino groups having 1 to 12 carbon atoms such as acetyl-N-methylamino, acetyl-N-ethylamino, propionyl-N-methylamino, butyryl-N-methylamino and so on; the halogen group of which examples are F, Cl, Br and so on; the alkoxyl group of which examples are alkoxyl groups having 1 to 12 carbon atoms such as methoxy, ethoxy, propoxy, butoxy, pentyloxy, hexyloxy and so on; and $SO_3M_{1/2}$ that M is the alkaline earth metal such as Be, Mg, Ca, Sr, Ba and so on.

But at least one of $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ of the salt of the dye represented by the chemical formula (2) is $SO_3M_{1/2}$. In other words, the salt has at least one $SO_3M_{1/2}$ in its chemical structure.

Especially M is furthermore preferably Ca among the alkaline earth metals, because the effect is improved more.

The alkaline earth metal salt of the anthraquinone-type acidic dye is prepared by exchanging from a hydrogen atom or an alkali metal of a sulfonic acid group of the acidic dye to the alkaline earth metal. Concretely the known or available anthraquinone-type acidic dye is reacted with an alkaline earth metal compound of which examples are hydroxide, sulfate or chloride of the alkaline earth metal to prepare. For a procedure of exchanging, a well-known ion-exchanging procedure is allowed to be used. The heat resistance thereof is strikingly improved by grace of the ion exchanging.

Verification thereof is explained by an example of following Compound Example No. 2-1. Results of thermal analysis between calcium salt of the anthraquinone-type acidic dye of Compound Example No. 2-1 and sodium salt as the alkali metal salt having the same chemical structure are compared. And difference of the heat resistance thereof is explained.

A measuring procedure is as follows. SII EXSTAR6000 as TG/DTA instrument that is available from Seiko Instruments Inc. is used. It is measured under an air current of 200 ml/min. with heating from 30° C. up to 550° C. and then keeping at the same temperature for 28 min. The sodium salt has a decomposition point of 235° C. by the thermal analysis, whereas the calcium salt is never decomposed. Therefore it is hard to be decomposed by heat and has sufficient heat stability. And it reduces the influence by heat during the resin molding and the laser welding. Consequently it has excellent laser-welding properties.

Therefore, because of the existence of the derivative of sulfone group in the structure of the dye, it cause anchor effect that is remaining phenomenon in resin. As shown in the chemical formula (1) or (2), the alkaline earth metal salt of the anthraquinone-type acidic dye of the present invention has $SO_3M_{1/2}$ that M is the alkaline earth metal in its chemical structure. It is assumed that a functional group having M of the alkaline earth metal causes especially an anchor effect in the resin composition. Thus it has stronger sublimation resistance, heat resistance, and chemical resistance than conventional neutral anthraquinone-type dye or organic amine salt of anthraquinone-type dye. It is also showed that the laser-welded article of the present invention has a high practical use for high-melting point engineering plastic because of these properties.

Regarding the heat resistance from these properties, it is preferable that the alkaline earth metal salt of the anthraquinone-type acidic dye represented by the chemical formula (2) is used.

As the purity of the alkaline earth metal salt of the anthraquinone-type acidic dye increases, the inhibition of the phenomenon of the sublimation thereof increases. It is preferable that the purity thereof is 80% or more, furthermore preferable that the purity thereof is 90% or more.

As the purity of the alkaline earth metal salt of the anthraquinone-type acidic dye decreases, relatively byproducts of impurities tend to increase with the contamination. The byproducts have lower molecular weight than one of the alkaline earth metal salt of the anthraquinone-type acidic dye represented by the above chemical formula (1) or (2). Consequently an amount of impurities having high solubility to the resin increases, it causes the phenomenon of the sublimation of the dye under high temperature remarkably, and it tends to decrease the heat resistance of the resin composition.

Examples of the alkaline earth metal salt of the anthraquinone-type acidic dye presented by the above chemical formula (1) or (2) are the following Compound Examples. This invention is not certainly intended to be limited to the following specific examples.

Compound Example No. 1-1

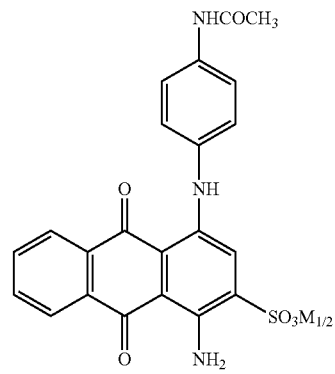

Compound Example No. 1-2

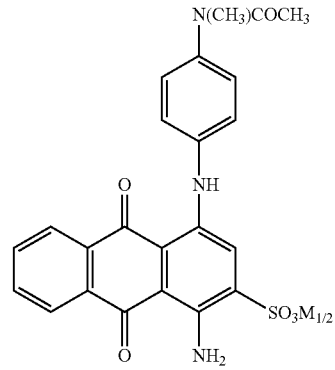

-continued
Compound Example No. 1-3
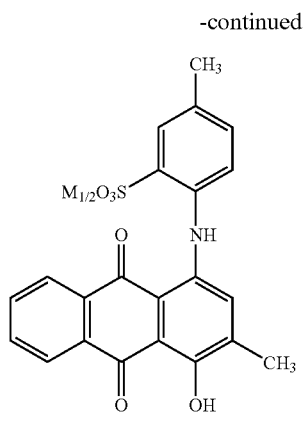
Compound Example No. 1-4
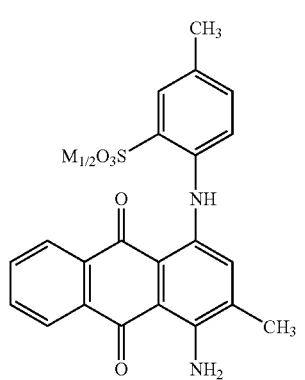
Compound Example No. 1-5
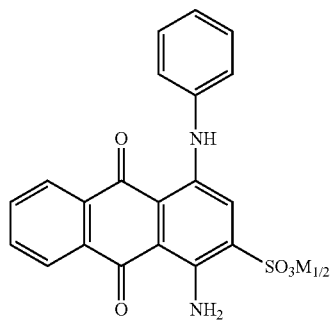
Compound Example No. 1-6
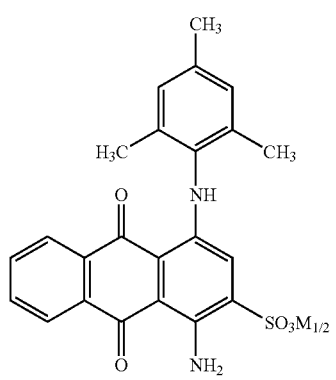
-continued
Compound Example No. 1-7
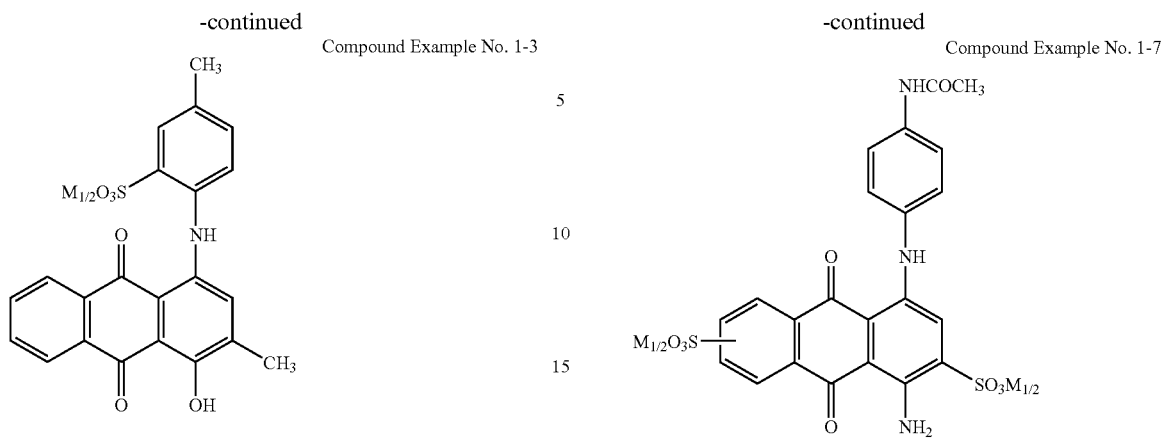
Compound Example No. 1-8
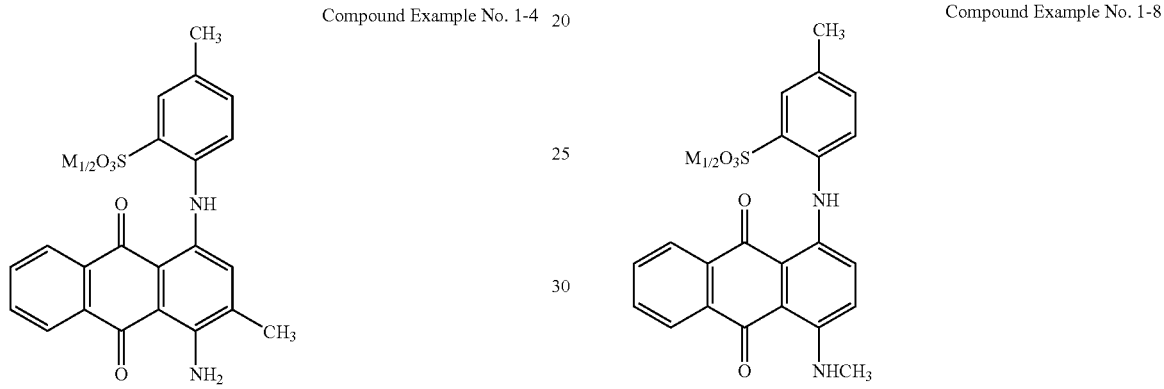
Compound Example No. 1-9
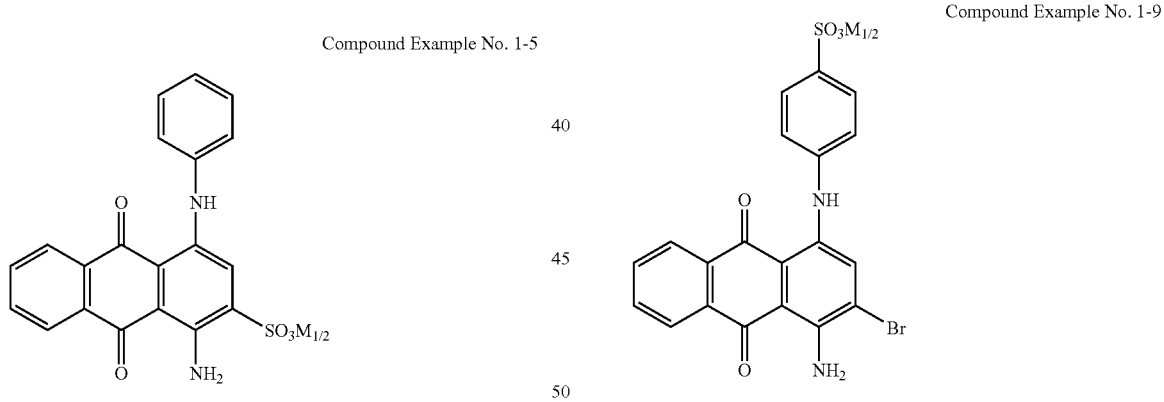
Compound Example No. 1-10
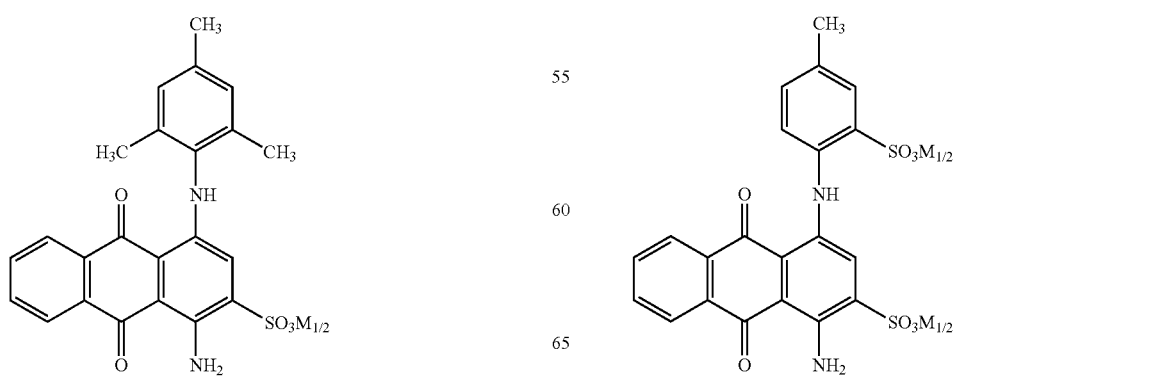

-continued
Compound Example No. 1-11
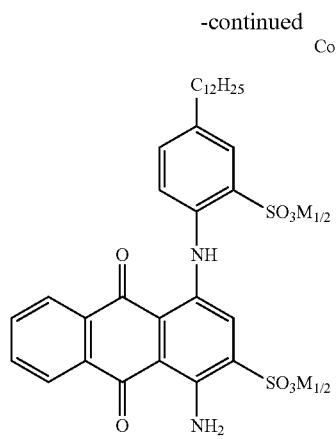
Compound Example No. 1-12
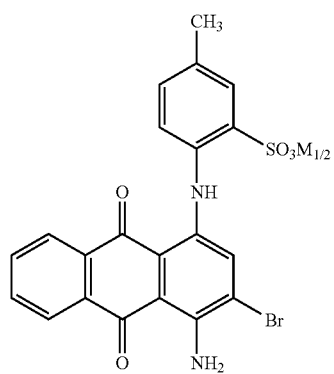
Compound Example No. 1-13
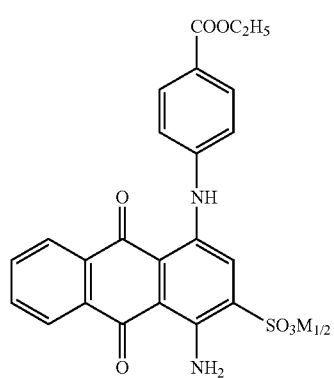
Compound Example No. 1-14
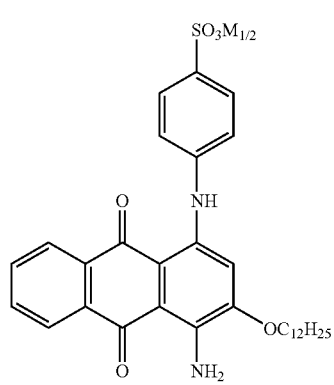
Compound Example No. 1-15
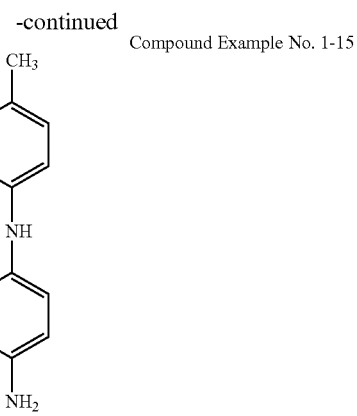
Compound Example No. 1-16
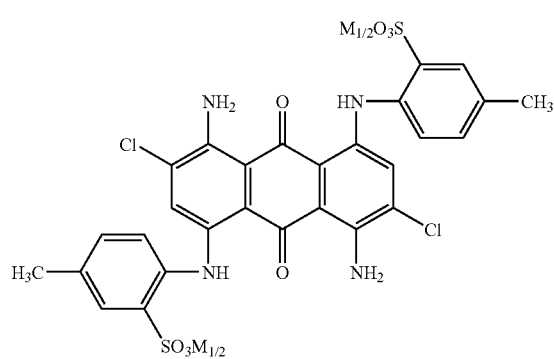
Compound Example No. 1-17
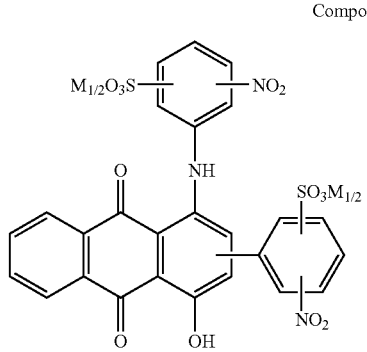
Compound Example No. 1-18
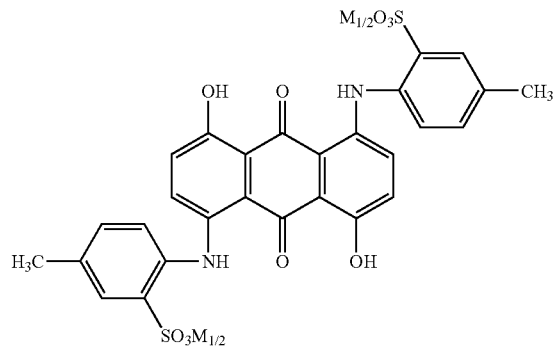

-continued
Compound Example No. 1-19
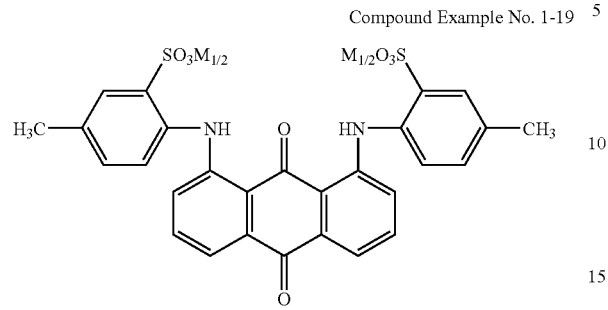
Compound Example No. 1-20
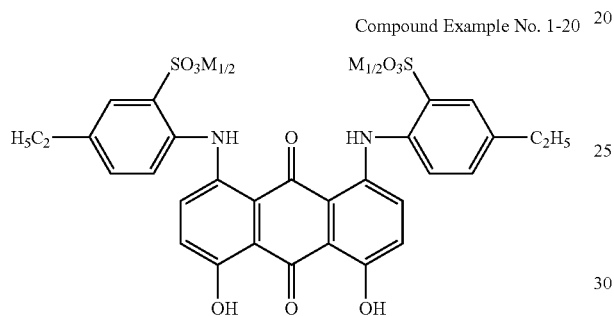
Compound Example No. 2-1
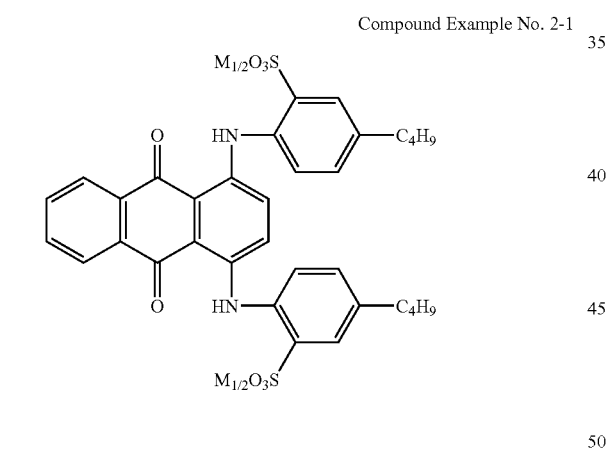
Compound Example No. 2-2
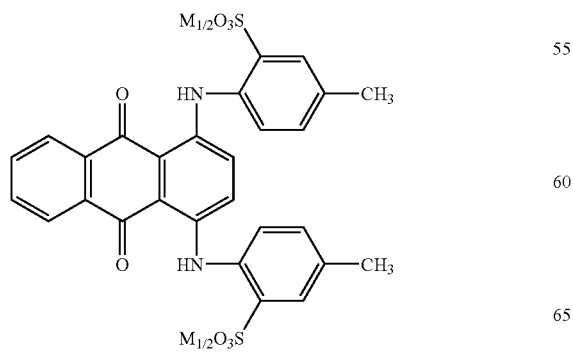
-continued
Compound Example No. 2-3
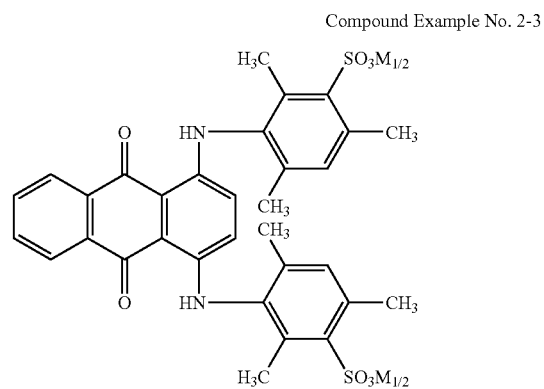
Compound Example No. 2-4
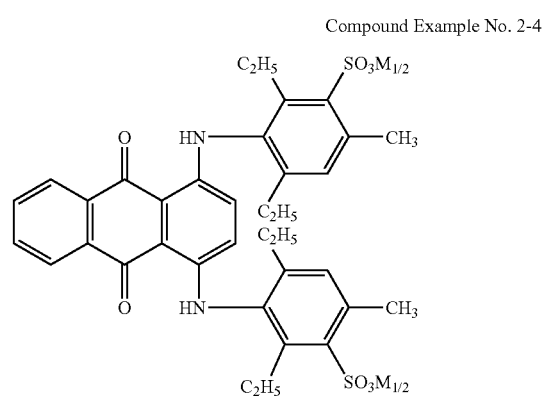
Compound Example No. 2-5
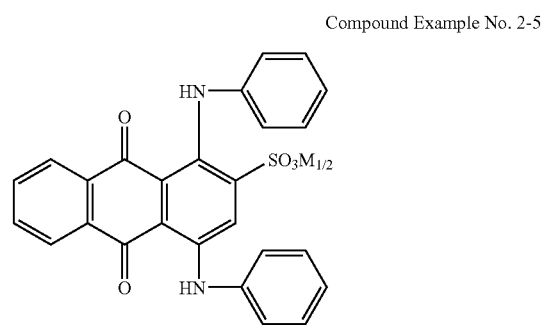
Compound Example No. 2-6
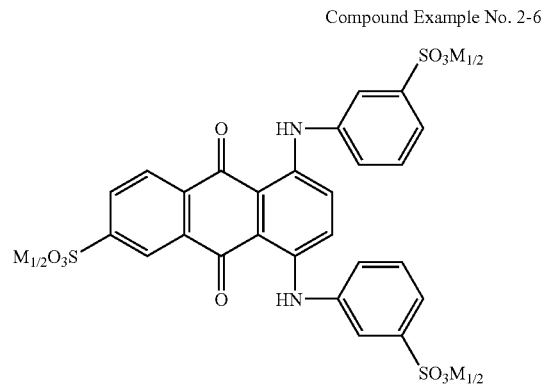

-continued

Compound Example No. 2-7

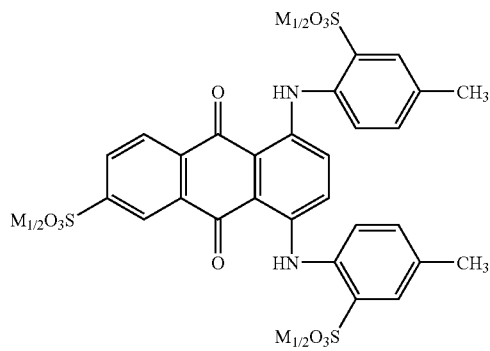

Compound Example No. 2-8

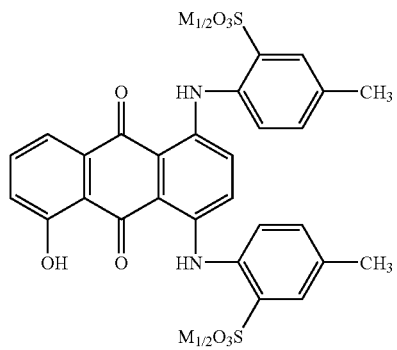

Compound Example No. 2-9

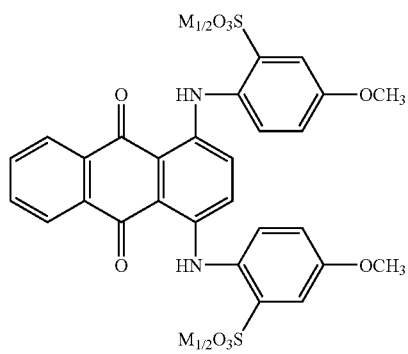

Compound Example No. 2-10

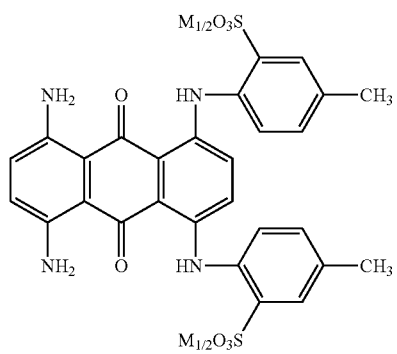

-continued

Compound Example No. 2-11

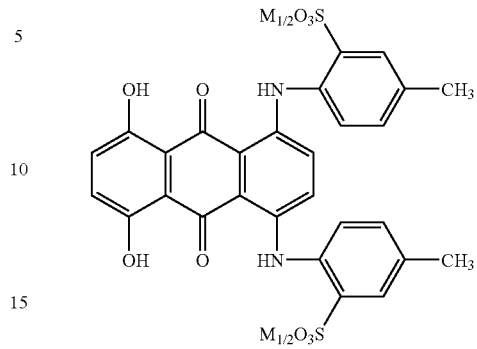

The alkaline earth metal salt of the anthraquinone-type acidic dye represented by the above chemical formulae (1) and (2) generally indicates a hue of blue or green color. As the colorant used for the laser welded articles of the present invention, the alkaline earth metal salt of the anthraquinone-type acidic dye is allowed to be used solely or plurally. It is also allowed to be used with various dyes.

The colorant in the laser-transmissible colored resin composition may include an additional dye with the alkaline earth metal salt of the anthraquinone-type acidic dye. The additional dye has absorption range which is outside of absorption range of just visible rays or supplementary inside of the absorption range of the visible rays, and has transmission range of the laser ranging wavelength of 800 to 1200 nm for laser welding. Sole additional dye or a blend of the plural additional dyes may be used.

It is used as the colorant for various color by blending the above alkaline earth metal salt of the anthraquinone-type acidic dye and the excellent laser-transmissible additional dye which indicates the hue of one color of red, yellow, orange, and so on. Examples of the colorant having the hue of black are mixtures of a blue dye of the above alkaline earth metal salt of the anthraquinone-type acidic dye, and the other red or yellow colorant. For using the laser-transmissible colored resin composition industrially, especially the black resin composition is important.

It is preferable that the black blended colorant indicates a hue of black color by blending the alkaline earth metal salt of the anthraquinone-type acidic dye and the yellow and/or red dye.

Examples of the blended colorant are described concretely and are combinations of the blue or violet alkaline earth metal salt of the anthraquinone-type acidic dye, and the yellow and/or red additional colorant. The multi-colored colorants indicate various hues such as the green illustrated by combination of blue and yellow, the violet illustrated by combination of blue and red, the black illustrated by combination of blue and yellow and red or combination of violet and yellow. It is especially preferable that anthrapyridone-type dye is used as the red colorant.

Examples of the colorant of the present invention are laser-transmissible organic dyes or pigments. They are not intended to be limited to the specific chemical structure thereof. The concrete examples of the organic dyes and pigments are various dyes or pigments of azomethine-type, quinacridone-type, dioxazine-type, diketopyrrolopyrrole-type, anthrapyridone-type, isoindolinone-type, indanthrone-type, perinone-type, perylene-type, indigo-type, thioindigo-type, quinophthalone-type, quinoline-type, and triphenylmethane-type.

Examples of the red colorant that is blended with the above alkaline earth metal salt of the anthraquinone-type acidic dye are red acidic dye such as C. I. Acid Red 80, C. I. Acid Red 144 and so on; red oil-soluble dye such as C. I. Solvent Red 179 and so on; halochromy dye prepared from ditolylguanidine and red acidic dye such as C. I. Acid Red 80, C. I. Acid Red 144 and so on; halochromy dye prepared from hexamethylenediamine and red acidic dye such as C. I. Acid Red 80, C. I. Acid Red 144 and so on; red acidic dye of the alkaline earth metal salt such as the alkaline earth metal salt of the anthrapyridone-type acidic dye.

It is especially preferable that the alkaline earth metal salt of the anthrapyridone-type acidic dye is blended.

Examples of the yellow colorant that is blended with the above alkaline earth metal salt of the anthraquinone-type acidic dye are yellow oil-soluble dye such as C. I. Solvent Yellow 163, C. I. Solvent Yellow 114 and so on, yellow acidic dye such as C. I. Acid Yellow 3, C. I. Acid Yellow 42, C. I. Acid Yellow 49 and so on.

Examples of the orange colorant that is blended with the above alkaline earth metal salt of the anthraquinone-type acidic dye are orange acidic dye such as C. I. Acid Orange 56 and so on, orange oil-soluble dye such as C. I. Solvent Orange 60 and so on.

The content of the colorant in the laser-transmissible colored resin composition is preferably 0.01 to 10 weight %, further preferably 0.1 to 5 weight %, furthermore preferably 0.1 to 1 weight % to the thermoplastic resin.

Laser-transmissivity of the laser-transmissible colored resin composition under wavelength of 940 nm is given as $T_1$. It is preferable that $T_1$ is more than 15%. Laser-transmissivity of a laser-transmissible non-colored resin composition that is similar with the laser-transmissible colored resin composition except for including no colorant under wavelength of 940 nm is given as $T_2$. $T_1/T_2$ that is ratio thereof is preferably 0.5 or more, further preferably ranging from 0.7 to 1.1, furthermore preferably ranging from 0.8 to 1.1.

The resin used for the laser-transmissible workpiece or the laser-transmissible colored resin composition consists of the thermoplastic resin that is melted by heating, is stiffened by cooling to restore, indicates reversible dynamics between melting by heating and stiffening by cooling, and is insoluble in solvent. Examples of the resin are a laser-transmissible resin used as a dispersant for the pigment, a known resin used as a carrier resin for masterbatches or colored pellets.

Concrete examples of the resin are typical thermoplastic resins such as polyphenylene sulfide resin (PPS); polyamide resin (PA); polyethylene resin (PE); polypropylene resin (PP); polystyrene resin (PS); polymethylpentene resin (PMP); polymethacrylate resin (PMMA); polyacrylamide resin; ethylenevinylalcohol (EVOH) resin; polycarbonate resin (PC); polyester resin illustrated by polyethylene terephthalate (PET), polybutylene terephthalate (PBT) and so on; polyvinyl chloride resin (PVC); polyvinylidene chloride resin (PVDC); polyphenylene oxide resin (PPO); polyarylate resin (PAR); fluorine-contained resin (PTFE); liquid crystal polymer (LCP); polyacetal resin (POM); polysulfone-type resin (PSU) and so on.

Further, the thermoplastic resin is allowed to be copolymer of two or more above-mentioned thermoplastic resins. Concrete examples of the resin are acrylonitrile-styrene copolymer resin (AS); acrylonitrile-butadiene-styrene copolymer resin (ABS); acrylonitrile-ethylene propylene diene monomer-styrene copolymer resin (AES); polyamide-polybutylene terephthalate copolymer resin (PA-PBT); polyethylene terephthalate-polybutylene terephthalate copolymer resin (PET-PBT); polycarbonate-polybutylene terephthalate copolymer resin (PC-PBT); polycarbonate-polyamide copolymer resin (PC-PA) and so on. And the other concrete examples of the resin are thermoplastic elastomer such as polystyrene-type thermoplastic elastomer, polyolefin-type thermoplastic elastomer, polyurethane-type thermoplastic elastomer, polyester-type thermoplastic elastomer; synthetic wax or natural wax containing thereof as a main component and so on.

It is not intended to be limited to specific molecular weight of the above thermoplastic resin. The above plural resins are allowed to blend.

It is preferable that the thermoplastic resin is the polyphenylene sulfide resin (PPS); the polyester resin which may be the polyethylene terephthalate (PET) or the polybutylene terephthalate (PBT); polyolefin resin; the polyamide resin which may be nylon; the polyacetal resin; or polysulfone-type resin which may be polyethersulfone resin (PES) or polyallylsulfone resin (PASF) or polyphenylene sulfide resin (PSF). Especially it is furthermore preferable that the thermoplastic resin is the polyphenylene sulfide resin (PPS).

Polyphenylene sulfide resin is a polymer having mainly repeated units of thiophenylene group represented by "-φ-S-" styled PPS whose φ is phenylene group having no substitutional groups or a substitutional group. A monomer synthesized by reacting with p-dichlorobenzene and alkali sulfide under high temperature and high pressure is polymerized to prepare this resin. Broadly mentioning, the resin is classified into two types. One type is a strait-chain-type rein having desired polymerization degree that the monomers are merely polymerized under the presence of an auxiliary initiator. Another type is a crosslinking-type resin that prepolymers are crosslinked by heating under presence of oxygen. The strait-chain-type rein is preferable, because transmittance thereof is sufficient.

Melting viscosity of the polyphenylene sulfide resin is not intended to be limited except that it is allowed to knead with melting. Ordinary, the resin having the melting viscosity ranging from 5 to 2000 Pa·s is used. It is furthermore preferable that the melting viscosity thereof is ranged from 100 to 600 Pa·s. The polyphenylene sulfide resin has relevant properties for electronic parts or automotive parts and so on.

The polyphenylene sulfide resin (PPS) is allowed to be polymer alloy. Examples thereof are PPS/polyolefin alloy, PPS/polyamide alloy, PPS/polyester alloy, PPS/polycarbonate alloy, PPS/polyphenylene ether alloy, PPS/liquid crystal polymer alloy, PPS/polyimide alloy, PPS/polysulfone alloy.

Examples of the polyester resin are polyethylene terephthalate resin that is prepared by condensation polymerization of terephthalic acid and ethylene glycol; and polybutylene terephthalate resin that is prepared by condensation polymerization of terephthalic acid and butylene glycol. Examples of the other polyester resins are copolymers that a part of terephthalic acid component of the above polyester resin being for example 15 mol % or less such as 0.5 to 15 mol %, preferably 5 mol % or less such as 0.5 to 5 mol %, and/or a part of ethylene glycol component or butylene glycol component thereof for example 15 mol % or less such as 0.5 to 15 mol %, preferably 5 mol % or less such as 0.5 to 5 mol %, are substituted for the other components. It may be blended two or more polyester resins.

Examples of the other components that substitute for the part of terephthalic acid component are aromatic dicarboxylic acid such as isophthalic acid, naphthalenedicarboxylic acid, diphenyldicarboxylic acid, diphenoxyethanedicarboxylic acid, diphenyletherdicarboxylic acid, diphenylsulfonedicarboxylic acid and so on; alicyclic dicarboxylic acid such as hexahydroterephthalic acid, hexahydroisophthalic acid and so on; aliphatic dicarboxylic acid such as adipic acid, sebacic acid, azelaic acid and so on; bifunctional carboxylic acid such as p-beta-hydroxyethoxy benzoic acid and so on. They are used solely or plurally.

Examples of the other components that substitute for the part of ethylene glycol component or butylene glycol component are multi-functional compounds such as glycol illustrated by trimethylene glycol, tetramethylene glycol, hexamethylene glycol, decamethylene glycol, neopentyl glycol, diethylene glycol, 1,1-cyclohexanedimethylol, 1,4-cyclohexanedimethylol, 2,2-bis(4'-beta-hydroxyethoxyphenyl)propane, bis(4'-beta-hydroxyethoxyphenyl)sulfonic acid and so on; and functional compounds thereof. They are used solely or plurally.

It is not intended to be limited to the specific polyolefin resins. Examples of the polyolefin resin are homopolymer and copolymer prepared with alpha-olefins such as ethylene, propylene, butene-1,3-methylbutene-1,4-methylpentene-1, octene-1 and so on. The other examples of polyolefin resin are copolymers of the above-mentioned olefins and an unsaturated monomer that can co-polymerize with them. The copolymer may be a block copolymer, a random copolymer, or a graft copolymer. Concrete examples of the polyolefin resin are polyethylene resin such as high-density polyethylene, middle-density polyethylene, low-density polyethylene, low-density polyethylene having straight chain, ethylene-vinyl acetate copolymer, ethylene-ethyl acrylate copolymer and so on; polypropylene resin such as propylene homopolymer, propylene-ethylene block copolymer, and propylene-ethylene random copolymer, propylene-ethylene-butene-1 copolymer; polybutene-1; poly(4-methylpentene-1) and so on. They are used solely or plurally. It is preferable that polyolefin resin is the polypropylene resin and/or the polyethylene resin, and further preferable that the polyolefin resin is the polypropylene resin. The polypropylene resin is not intended to be limited to the specific resin and is used within extensive molecular weight.

Incidentally, the polyolefin resin may be an acid-denaturalized polyolefin that is denaturalized by an unsaturated carboxylic acid or a derivative thereof; a foam resin prepared using a foaming agent such as foam polypropylene. And polyolefin resin may include ethylene-alpha-olefin copolymer rubber; ethylene-alpha-olefin-nonconjugated diene copolymer such as ethylene propylene diene monomer (EPDM) and so on; ethylene-aromatic monovinyl compound-conjugated diene copolymer rubber, or hydrogenated rubber thereof.

Examples of the polyamide resin are nylon that is a registered trademark such as nylon 6, nylon 66, nylon 46, nylon 11, nylon 12, nylon 69, nylon 610, nylon 612, nylon 96, non-crystal nylon, nylon having high melting point, nylon RIM, nylon MIX6 and so on; copolymer of two or more kinds thereof, such as nylon 6/66 copolymer, nylon 6/66/610 copolymer, nylon 6/66/11/12 copolymer, crystal nylon/non-crystal nylon copolymer and so on. The polyamide resin may be mixed polymers of the above polyamide resin and the other synthetic resins. Examples of the mixed polymers are polyamide/polyester mixed polymers, polyamide/polyphenyleneoxide mixed polymers, polyamide/polycarbonate mixed polymers, polyamide/polyolefin mixed polymers, polyamide/styrene/acrylonitrile mixed polymers, polyamide/polyacrylate mixed polymers, polyamide/silicone mixed polymers, and so on. They are used solely or plurally.

The polyacetal resin is a polymer comprising of a principal unit of oxymethylene group ($-CH_2O-$). It is allowed to be polyoxymethylene homopolymer; copolymer, terpolymer or block copolymer comprising of the principal unit of oxymethylene group and a bit of the other unit. It is allowed to have molecular structure of straight chain, branched chain or crosslinking structure. And it is not intended to be limited to polymerization degree.

The polysulfone-type resin (PSU) is a non-crystal thermoplastic resin comprising of a bonding group of $-SO_2-$ in its molecular structure of which appearance is transparent, amber and glossy. The method of synthesis thereof is performed by a polycondensation reaction with dichlorodiphenyl sulfone and sodium salt of bisphenol A. Examples of the other polysulfone-type resin are polyether sulfone resin (PES), polyaryl sulfone resin (PASF), polyphenyl sulfone resin (PSF) and so on.

The polysulfone-type resin is allowed to include the other resin within keeping the effect of the invention up. For example, copolymer of polysulfone and polycarbonate; copolymer of polysulfone and polyamide; copolymer of polysulfone, polycarbonate and liquid crystal polymer; copolymer of polysulfone, polyamide and liquid crystal polymer are allowed to be used. And a blended mixture of polysulfone and polycarbonate; a blended mixture of polysulfone and polyamide; a blended mixture of polysulfone, polycarbonate and liquid crystal polymer; a blended mixture of polysulfone, polyamide and liquid crystal polymer; a blended mixture of liquid crystal polymer and copolymer of polysulfone and polyamide are allowed to used. They are used solely or plurally.

The laser-transmissible colored resin composition may include various additive agents if necessary. Examples of the additive agent are an auxiliary coloring agent, a dispersant, a reinforcer (or a filler), a stabilizer, a plasticizer, a reforming agent, an ultraviolet-absorptive agent (or a light-stabilizer), an antioxidant, an antistatic agent, a lubricant, a mold releasing agent, a crystallization accelerator, a crystalline germ agent, a flame retarder, an elastomer for improvement of shock resistance and so on.

The laser-transmissible colored resin composition may properly include various reinforcing agents or filler in response to a use and a purpose. The reinforcing agents, which are generally used for reinforcement of the synthetic resin, are not intended to be limited. Examples of the reinforcing agent are glass fiber, carbon fiber, the other inorganic fibers; and organic fiber made from aramid, polyphenylene sulfide, nylon, polyester, liquid crystal polymer and so on. The glass fiber is preferably used for reinforcement of the resin desired transparent. It is preferable that length of the glass fiber is ranging from 2 to 15 mm and a diameter thereof is ranging from 1 to 20 microns. A shape of the glass fiber is not intended to be limited. Examples of the shape thereof are roving, milled fiber and so on. The glass fiber is used solely or plurally. The content of the glass fiber is preferably ranging from 5 to 120 parts by weight to the thermoplastic resin of 100 parts by weight. If it is less than 5 parts by weight, it is difficult that sufficient reinforcement effect of the glass fiber is caused. If it is more than 120 parts by weight, moldability tends to decrease. It is preferably 10 to 60 parts by weight, further preferably 20 to 50 parts by weight.

The other examples of the filler are plate-shaped filler such as mica, sericite and glass flakes; silicate such as talc, kaolin, clay, wollastonite, bentonite, asbestos and alumina silicate; metal oxide such as alumina, silicon oxide, magnesium oxide, zirconia and titanium oxide; carbonate such as calcium carbonate, magnesium carbonate and dolomite; sulfate such as calcium sulfate and barium sulfate; and granular filler such as glass beads, ceramic beads, boron nitride and silicon carbide.

The colored resin composition of the present invention is prepared by an arbitrary method for blending materials. It is preferable that the materials are generally blended as homogeneously as possible. For example, the resin composition may be prepared by blending all materials homogeneously with a mixer such as a blender, a kneader, a banbury mixer, a roll, an extruder and so on. Another resin compositions may be prepared by blending some of the materials with the mixer and then by blending the remainder of the materials homogeneously. Another resin compositions as colored grain pellets may be prepared by dry-blending the materials ahead, melting and kneading them homogeneously, extruding them as wire with the heated extruder, and then cutting with desired length.

The colored resin composition of the present invention as masterbatches may be prepared by an arbitrary method. For example, the masterbatches may be prepared by mixing the resin powder or the pellets as base of the masterbatches, and the colorant with the mixer such as a tumbler, a supermixer and so on, heating and melting with the extruder, a batch-type kneader or a roll-type kneader and so on, and then forming pellets or grain. Another masterbatch may be prepared by adding the colorant to a synthesized resin for the masterbatches in reaction mixture including solvent, and then removing the solvent.

Molding process of the colored resin composition of the present invention may be executed by general various procedures. For example, the molding process may be executed by using the colored pellets with a processing machine such as an extruder, an injection molding machine, a roll mill and so on. Another molding process may be executed with a proper mixer by mixing the pellets or the grain made from the transparent resin, the granulated colorant, and the additive agent if necessary, and then molding thereof with the processing machine. Another molding process may be executed by adding the colorant to the monomer including a proper polymerization catalyst, polymerizing thereof to obtain the desired resin, and then molding the resin by a proper procedure. Examples of the procedure of molding are general molding procedures such as injection molding, extrusion molding, compression molding, foaming molding, blow molding, vacuum molding, injection blow molding, rotational molding, calendaring molding, solution casting and so on. The laser-transmissible workpieces having various shapes are obtained by these procedures of molding.

The method for the laser welding of the present invention is shown in FIG. 1, for example. The method comprises:

putting the laser-transmissible workpiece 1 made from the above-mentioned laser-transmissible colored thermoplastic resin composition and the laser-absorptive workpiece 2 together as they are put to be piled at respective stairs 4 and 5 thereof, irradiating the laser 3 to the laser-transmissible workpiece 1, welding the laser-transmissible workpiece 1 and the laser-absorptive workpiece 2 at least of put portion together thereof, by the laser 3 that transmits through the laser-transmissible workpiece 1 and is absorbed into the laser-absorptive workpiece 2.

Merits of the method for the laser welding are improving a variety of shape of molds because of feasibility of three dimensional welding; improving design because of having no burrs on surface of welding that differs from a method of vibration welding; generating of no vibration and no abrasion powder; and causing feasibility of application to electric workpieces and so on.

Demerits of the method for the laser welding are necessity of prior industrial investment such as a laser welding machine; generating of a gap between the welded workpieces by the formed sink marks after welding thereof. Especially, the demerit of the gap is the most important problem for an operator of the laser welding machine. For the present, the operator makes a holding implement such as a clamp that fits the shape of the welded workpieces. If the welded workpieces have 0.02 mm of the gap, the welding strength decreases to half as compared with that of the welded workpieces having no gap. If the welded workpieces have 0.05 mm or more of the gap, welding cannot be executed.

Examples of a laser irradiation procedure are a scanning type that laser beam source moves; a masking type that the welding workpieces move; a multi-irradiating type that the welding workpieces are irradiated by the laser from multi ways; and so on. The laser irradiation procedure under the automobile industry is the scanning type. The scanning speed thereof is 5 m/min. as standard production tact time.

In principle, the laser welding takes advantage of conversion of light energy of the laser to thermal energy. So the welding property is influenced by condition of the laser welding strikingly.

Generally, quantity of surface heat energy that the laser-absorptive workpiece accepts from the laser can be calculated by the following numerical expression.

Quantity of Surface Heat of Laser-absorptive Workpiece $(J/mm^2)$=Output Power of Laser $(W)$/Scanning Speed (mm/sec.)/Diameter of Laser Spot (mm)  (I)

According to the numerical expression, it is evident that raising the scanning speed is needed to improve productive efficiency. So the laser welding machine of high output power is necessary industrially.

The improvement of welding strength needs the proper quantity of surface heat of laser-absorptive workpiece. It is necessary to try various conditions such as raising the output power, slowing the scanning speed a little, and decreasing the diameter of the laser spot. If the quantity of surface heat by the laser is much, an appearance of the welded workpiece is spoiled. If the quantity is too much, the welded workpiece fumes. So setting up the proper condition of the laser welding is very important.

In the method of the laser welding, the laser-transmissivity of the laser-transmissible workpiece is at least 15% under wavelength of the irradiated laser used for the laser welding, that is ranging from approximate 800 nm of semiconductor laser to approximate 1100 nm of the yttrium aluminum garnet (YAG) laser. And it is preferable that the infrared-transmissivity is at least 20% under one or more wavelengths of 808 nm, 840 nm, 940 nm and 1064 nm of the laser. If the transmissivity is less than the range, the sufficient quantity of the laser of those wavelengths does not transmit. So the strength of the welded workpieces is insufficient, or unusual excess energy of the laser is needed.

In the method of the laser welding, it is preferable that the laser is irradiated with scanning, and furnishes an energy quantity x(J/mm) that satisfies the following numerical expression (II).

$$5.0 \geq x=(p \times T) \div (100 \times q) \geq 0.4 \quad \text{(II)}$$

In the numerical expression (II), p(W) is the output power of the laser; q(mm/sec.) is the scanning speed of the laser; T is laser-transmissivity of the laser-transmissible resin workpiece under the wavelength of the laser. Adjusted conditions that the numerical expression is satisfied are preferable for using the workpieces industrially. For welding of a sufficient transmissible non-crystal thermoplastic resin such as polysulfone-type resin (PSU) of the present invention, it is preferable that x is ranging from 0.3 to 2.0, and further preferable that x is ranging from 0.4 to 1.5. If x of the welding condition is less than 0.3, the welding strength is insufficient for practicability for using. On the other hand, for welding of an insufficient transmissible crystalline thermoplastic resin such as polyphenylene sulfide resin of the present invention, it is preferable that x is ranging from 1.0 to 5.0, and further preferable that x is ranging from 2.0 to 5.0. If x of the welding condition is more than 5.0, accuracy of the welding portion is decreased because so strong energy causes sudden melting, and the welding strength is decreased to generate the burrs.

The method for the laser welding of the present invention may comprise the welding of the laser-absorptive resin workpiece 2 having the coating layer 9 applied by ink and/or paint including the laser-absorbent as the coating layer including the laser-absorbent and the laser-transmissible workpiece 1, as shown in FIG. 3.

For example, first of all, the ink and/or the paint including the laser-absorbent and the resin if necessary are prepared. The applying thereof onto the laser transmissible workpiece 7 is beforehand executed by an arbitrary applying procedure such as spraying, coating with a marking pen, a painting brush, a writing brush and so on. It is preferable that thickness of the applied layer is 0.1 mm or less. The coating layer 9 including the laser-absorbent is formed by applying thereof. The laser transmissible workpiece 7 and the coating layer 9 are unified to be the laser-absorptive resin workpiece 2. The coating layer 9 including the laser-absorbent and the laser-transmissible workpiece 1 are put together for welding. Then the laser is irradiated towards the laser-transmissible workpiece 1 to obtain the laser-welded article.

The laser-absorptive workpieces are preferably made from the laser-absorptive colored resin composition, furthermore preferably made from the laser-absorptive colored thermoplastic resin composition, including at least carbon black as the laser-absorptive agent and concurrently the black colorant. It is preferable that the carbon black has the diameter of primary particles ranging 18 to 30 nm. When the above-mentioned carbon black is used, the obtained laser-absorptive workpieces that the carbon black is dispersed sufficiently therein absorb the laser with high absorptivity.

Nigrosine dye may be used with carbon black. It is preferable that the nigrosine dye belongs to C. I. solvent black 7 since it controls the proper laser-absorptivity.

And the laser-absorptive workpiece may be made from the laser-absorptive colored resin composition including the other colorant except for carbon black; and a laser-absorptive agent such as phthalocyanines, cyanines and metal complexes. It may be made from the laser-absorptive colored resin composition including the laser-absorbent that acts for colorant concurrently except for carbon black.

The laser-absorptive workpiece is prepared by a similar preparing procedure of the above-mentioned laser-transmissible workpiece except for including the laser-absorbent. It is allowed to include a suitable amount of various additive agents according to the usage and the purpose. On the occasion of the preparing, the above-mentioned blend and forming procedures are allowed to be use. The alkaline earth metal salt of the anthraquinone-type acidic dye, the various colorants and the various dye or pigment such as the organic dye or pigment for preparing the above-mentioned laser-transmissible workpiece are allowed to be use. The material for preparing the laser-absorptive workpiece is chosen from broad one, because it is not limited to the transmittance in comparison with the material for preparing the laser-transmissible workpiece.

In the laser-absorptive colored resin composition, the content of the colorant may be 0.01 to 10 weight % to the resin, preferably to the thermoplastic resin. It is further preferable that the content of the colorant is 0.05 to 5 weight %.

The laser-welded article of the present invention is obtained by the above-mentioned method for the laser welding. The laser-welded article has the sufficient heat resistance and fastness such as light fastness, the excellent migration resistance and chemical resistance, and gives the vivid hue.

And principal examples of the usage of the laser-welded article of the present invention are automobile parts such as an instrument panel of interior decoration and a resonator that is a silencer in an engine room.

In conventional occasion of adhering the workpieces made from the thermoplastic resin, a contraption such as pretreatment to the surface thereof is necessary, since an adhesive material had been hard to be used onto untreated surface thereof. But it is unnecessary for the laser welding to treat troublesome procedures such as pretreatment or preparing alloy resin. And regarding the strength and recycling, the laser welding is more excellent than adhering.

Following examples describe embodiments concretely. The invention is not intended to be limited to specific embodiments.

Manufacture Examples 1 to 11 in Table 1 show the colorant used for Examples mentioned later. Comparative Manufacture Examples 1 to 7 in Table 1 show the colorant used for the Comparative Examples mentioned later. In the Manufacture Examples, the dyes correspond to the colorant of the above-mentioned Compound Examples.

Manufacture Examples 3, 7, 10 and 11, and Comparative Manufacture Example 5 show the black colorant blended the plural dyes and the colorants in accordance with a ratio of weight indicated in a column of rate of blending.

Incidentally, inside values of brackets in the Table 1 show the determined purity thereof by measuring the high pressure liquid chromatography (HPLC).

TABLE 1

| Manufacture Example | Colorant | Rate of Blending |
|---|---|---|
| Manufacture Example 1 | Compound Example No. 1-6 (95.2%) Sr Salt | — |
| Manufacture Example 2 | Compound Example No. 2-3 (96.7%) Ca Salt | — |
| Manufacture Example 3 | Compound Example No. 2-3 (96.7%) Ca Salt | 2 |
| | Compound Example A (95.9%) Ca Salt | 1 |
| | C.I. Solvent Yellow 163 | 1 |
| Manufacture Example 4 | Compound Example No. 2-3(96.7%) Ba Salt | — |
| Manufacture Example 5 | Compound Example No. 1-7(96.5%) Ba Salt | — |
| Manufacture Example 6 | Compound Example No. 2-1(95.5%) Ba Salt | — |
| Manufacture Example 7 | Compound Example No. 2-1(95.5%) Ba Salt | 5 |
| | Compound Example A (95.9%) Ca Salt | 1 |
| Manufacture Example 8 | Compound Example No. 2-4(95.8%) Ca Salt | — |
| Manufacture Example 9 | Compound Example No. 1-15(96.9%) Ca Salt | — |
| Manufacture Example 10 | Compound Example No. 2-4(95.8%) Ca Salt | 3 |
| | Compound Example A (95.9%) Ca Salt | 2 |
| | C.I. Pigment Yellow 147 | 1 |
| Manufacture Example 11 | Compound Example No. 1-15(96.9%) Ca Salt | 6 |
| | C.I. Pigment Yellow 147 | 1 |
| Comparative Manufacture Example 1 | Compound Example No. 1-6 Na Salt | — |
| Comparative | Compound Example No. 2-3 Na Salt | |

TABLE 1-continued

| Manufacture Example | Colorant | Rate of Blending |
|---|---|---|
| Manufacture Example 2 Comparative | | |
| Manufacture Example 3 Comparative | Compound Example No. 2-3 K Salt | — |
| Manufacture Example 4 Comparative | Anthraquinone-type Halochromy Dye | — |
| Manufacture Example 5 Comparative | C.I. Solvent Green 3<br>C.I. Solvent Red 22 | 3<br>2 |
| Manufacture Example 6 Comparative | C.I. Solvent Violet 13 | — |
| Manufacture Example 7 Comparative | C.I. Solvent Blue 97 | — |

M Salt such as Ca Salt was described in Table 1 as the metal species that was reacted with the alkaline earth metal salt of the anthraquinone-type acidic dye, the sulfone group of the alkaline earth metal salt of the anthraquinone-type acidic dye and the anthrapyridone-type dye of the present invention.

Incidentally, Compound Example A in Table 1 is Ca Salt of the red anthrapyridone-type dye represented by the following chemical formula of which M is Ca.

Compound Example No. A

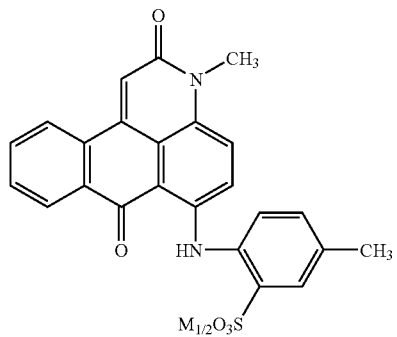

And C. I. Solvent Yellow 163 (C. I. 58840) and C. I. Pigment Yellow 147 (C. I. 60645) are the yellow anthraquinone-type dyes, C. I. Solvent Green 3 (C. I. 61565) is the green anthraquinone-type dye, C. I. Solvent Violet 13 (C. I. 60725) is the violet anthraquinone-type dye, C. I. Solvent Blue 97 (C. I. 615290) is the blue anthraquinone-type dye, C. I. Solvent Red 22 (C. I. 21250) is the red disazo-type dye in Examples respectively.

Examples 1 to 8 and Comparative Examples 1 to 5 are embodiments applied the present invention of the laser-welded article prepared as the same size and shape by using of the polyphenylene sulfide resin.

Example 1

(1-a) Preparation of Laser-Transmissible Workpiece 400 g of the polyphenylene sulfide resin of catalog No. 0220A9 that is available from Polyplastics Co., Ltd. and has 350 Pa·s of the melting viscosity 0.80 g of the colorant of Manufacture Example 1

The above compounds were added in a tumbler made of stainless steel, and mixed with stirring for 1 hour. The obtained mixture was executed an injection molding at 320° C. of temperature of a cylinder and 140° C. of temperature of a metal mold with general procedures using an injection molding machine of catalog No. Si-50 that is available from Toyo Machinery & Metal Co., Ltd. As shown in FIG. 1, a laser-transmissible workpiece 1 of a plate that has length of 60 mm, width of 18 mm and thickness of 3 mm with the proviso of the end portion having the stair 4 of the thickness of 1.5 mm and length of 20 mm from the edge by lacking an under side thereof was obtained. The surface and appearance of the laser-transmissible workpiece were glossy, regular and blue uniformly.

(1-b) Preparation of Laser-Absorptive Workpiece 1000 g of the polyphenylene sulfide resin of catalog No. 0220A9 that is available from Polyplastics Co., Ltd.

5 g of carbon black

The above compounds were added in the tumbler made of stainless steel, and mixed with stirring for 1 hour. The obtained mixture was executed the injection molding at 320° C. of temperature of the cylinder and 140° C. of temperature of the metal mold with general procedures using the injection molding machine of catalog No. Si-50 that is available from Toyo Machinery & Metal Co., Ltd. As shown in FIG. 1, a laser-absorptive workpiece 2 of a plate that has length of 60 mm, width of 18 mm and thickness of 3 mm with the proviso of the end portion having the stair 5 of the thickness of 1.5 mm and length of 20 mm from the edge by lacking an upper side thereof was obtained. The surface and appearance of the laser-absorptive workpiece were glossy, regular and black uniformly.

(1-c) Manufacture of Laser-Welded Article

As shown in FIG. 1, the stairs 4 and 5 of the both workpieces 1 and 2 were put together and piled. The diode laser machine having 30 W of the output power that is available form Fine Device Co., Ltd. was used. The scanning laser beam 3 of the wavelength of 940 nm and the diameter of the laser spot of 0.6 mm was continuously irradiated from upper side of the laser-transmissible workpiece 1 towards the put portion to a direction indicated by an arrow of FIG. 1, by the machine under 4 mm/sec. of scanning speed to obtain the laser-welded article.

(Physical Evaluation)

The laser-transmissible workpiece and the laser-welded article of Example 1 were evaluated by the following procedure for physical evaluations.

Physical Evaluation of the Laser-Transmissible Workpiece (1) Determination Test of the Transmissivity Each of the laser-transmissible workpieces was set up onto a spectrophotometer of catalog No. V-570 that is available from JASCO Corporation. The transmissivity of a portion of the stair 4 with thickness of 1.5 mm of the laser-transmissible workpiece 1 that is shown in FIG. 1 was determined under the wavelength λ ranging from 400 to 1200 nm. In table 2, the transmissivity of the laser-transmissible workpiece under the wavelength of 940 nm for welding by semiconductor laser, is shown.

(2) Heat Resistance Test and its Evaluation

When the injection molding was executed in Example 1, a part of the blended mixture as the laser-transmissible colored resin composition was executed general shots of the injection molding, to obtain the initiative laser-transmissible workpieces. The remainder of the mixture in the cylinder was kept at 320° C. of the cylinder for 15 minutes, and then it was executed the same shots of the injection molding to obtain subsequent laser-transmissible workpieces.

The color difference represented by ΔE between the initiative laser-transmissible workpiece and the subsequent laser-transmissible workpiece was measured by a calorimeter of catalog No. JP7000 that is available from JUKI Corporation. When color difference represented by ΔE thereof was 1.0 or less, it was judged to have the heat resistance.

Comparative Examples and other Examples except Example 1 were set the temperature of the cylinder respectively by following kinds of the resin in Table 2.

(3) Heat-Retrogradation Resistance Test and its Evaluation

The laser-transmissible workpiece obtained by the injection molding in Example 1 was preserved at 190° C. in a thermostatic oven for 1 month. The color difference between the laser-transmissible workpiece preserved for 1 month and a laser-transmissible workpiece that was freshly obtained by the general shot was measured. When color difference represented by ΔE thereof was 1.0 or less, it was judged to have the heat stability.

Comparative Examples and other Examples except Example 1 were set oven temperature respectively by following kinds of the resin in Table 2.

(4) Sublimation Resistance Test and its Evaluation

The laser-transmissible workpiece was put onto a white polyethylene terephthalate (PET) film, and they were preserved in an oven at 160° C. for 3 hours. The PET films were removed from the laser-transmissible workpieces, and put onto a colorless transparent sheet for overhead projector (OHP) in order to observe easily. When the PET films were not colored, it was judged to have the excellent sublimation resistance.

Comparative Examples and other Examples except Example 1 were set oven temperature respectively by following kinds of the resin in Table 2.

TABLE 2

| Kinds of Resin | Heat Resistance Test | Heat-retrogradation Resistance Test | Sublimation Resistance Test |
|---|---|---|---|
| Polyphenylene Sulfide Resin | 320° C. | 190° C. | 160° C. |
| Polybutylene Terephthalate Resin | 260° C. | 150° C. | 160° C. |
| Polyamide Resin | 270° C. | 150° C. | 160° C. |
| Polyacetal Resin | 230° C. | 120° C. | 120° C. |
| Polysulfone Resin | 340° C. | 190° C. | 160° C. |
| Polyether Sulfone Resin | 360° C. | 190° C. | 160° C. |

Physical Evaluation of the Laser-Welded Article

(5) Visual Observation of its Appearance

The appearance of the laser-transmissible workpiece obtained in Example 1 was judged by the visual observation if there were flaws on the surface.

(6) Tensile Strength Test

As regards the laser-welded article obtained in Example 1, it was tensed under 10 mm/min. of tensile speed to both opposite dimensions of lengthwise of the laser-welded article that the welding position was pulled apart in accordance with Japanese Industrial Standard K 7113-1995, to determine the tensile strength of welding by the tensile strength test using a tensile strength tester of catalog No. AG-50kNE that is available from Shimadzu Corporation.

Example 2

(2-a) Preparation of Laser-Transmissible Workpiece

The procedure was executed as same as Example 1 except for using colorant in Manufacture Example 2 instead of the colorant in Manufacture Example 1. And a laser-transmissible workpiece 1 was obtained. The surface and appearance of the laser-transmissible workpiece were glossy, regular and blue uniformly.

(2-b) Preparation of Laser-Absorptive Workpiece and (2-c) Manufacture of Laser-Welded Article A black laser-absorptive workpiece 2 and a laser-welded article shown in FIG. 1 were obtained by the same procedure as Example 1. And they were evaluated by the same physical evaluations as Example 1.

Example 3

(3-a) Preparation of Laser-Transmissible Workpiece 900 g of the polyphenylene sulfide resin of catalog No. 0220A9 that is available from Polyplastics Co., Ltd.

100 g of the colorant of Manufacture Example 3

The above compounds were added in the tumbler made of stainless steel, and mixed with stirring for 1 hour. The obtained mixture was kneaded and melted at 320° C. of temperature of the cylinder using a single screw extruder of catalog No. E30SV that is available from ENPLA Industry Co. Then it was cooled in a water tank, and cut by a pelletizer. Through a drying procedure, black masterbatch including 10 weight % of concentration of the colorant was obtained.

475 g of the polyphenylene sulfide resin of catalog No. 0220A9 that is available from Polyplastics Co., Ltd.

25 g of the black masterbatch

The above compounds were added in the tumbler made of stainless steel, and mixed with stirring for 1 hour. The obtained mixture was executed the injection molding at 320° C. of temperature of the cylinder and 140° C. of temperature of the metal mold with general procedures using the injection molding machine of catalog No. Si-50 that is available from Toyo Machinery & Metal Co., Ltd. A laser-transmissible workpiece 1 having the shape shown in FIG. 1 was obtained by the injection molding. The surface and appearance of the laser-transmissible workpiece were glossy, regular and black uniformly.

(3-b) Preparation of Laser-Absorptive Workpiece and (3-c) Manufacture of Laser-Welded Article 1000 g of the polyphenylene sulfide resin of catalog No. 0220A9 that is available from Polyplastics Co., Ltd.

5 g of carbon black

The above compounds were added in the tumbler made of stainless steel, and mixed with stirring for 1 hour. The obtained mixture was executed the injection molding at 260° C. of temperature of the cylinder and 80° C. of temperature of the metal mold using the injection molding machine of catalog No. Si-50 that is available from Toyo Machinery & Metal Co., Ltd. As shown in FIG. 1, a laser-absorptive workpiece 2 of a plate that has length of 60 mm, width of 18 mm and thickness of 3 mm with the proviso of the end portion having the stair 5 of the thickness of 1.5 mm and length of 20 mm from the edge by lacking an upper side thereof was obtained. A laser-welded article was obtained by the same procedure as Example 1 (1-c). And they were evaluated by the same physical evaluations as Example 1.

Example 4

(4-a) Preparation of Laser-Transmissible Workpiece

The procedure was executed as same as Example 1 except for using colorant in Manufacture Example 4 instead of the colorant in Manufacture Example 1. And a laser-transmissible workpiece 1 was obtained. The surface and appearance of the laser-transmissible workpiece were glossy, regular and blue uniformly.

(4-b) Preparation of Laser-Absorptive Workpiece and (4-c) Manufacture of Laser-Welded Article A black laser-absorptive workpiece 2 and a laser-welded article shown in FIG. 1 were obtained by the same procedure as Example 1. And they were evaluated by the same physical evaluations as Example 1.

Example 5

(5-a1) Preparation of Laser-Transmissible Workpiece 1

400 g of the polyphenylene sulfide resin of catalog No. 0220A9 that is available from Polyplastics Co., Ltd. and has 350 Pa·s of the melting viscosity 0.80 g of the colorant of Manufacture Example 5

The above compounds were added in the tumbler made of stainless steel, and mixed with stirring for 1 hour. The obtained mixture was executed the injection molding at 320° C. of temperature of the cylinder and 140° C. of temperature of the metal mold with general procedures using the injection molding machine of catalog No. Si-50 that is available from Toyo Machinery & Metal Co., Ltd. As shown in FIG. 1, a laser-transmissible workpiece 1 of a plate that has length of 60 mm, width of 18 mm and thickness of 3 mm with the proviso of the end portion having the stair 4 of the thickness of 1.5 mm and length of 20 mm from the edge by lacking an under side thereof was obtained. The surface and appearance of the laser-transmissible workpiece were glossy, regular and blue uniformly.

(5-a2) Preparation of Laser-Transmissible Workpiece 7

A laser-transmissible workpiece 7 was obtained by the same injection molding as the laser-transmissible workpiece 1 of (5-a1). The surface and appearance of the laser-transmissible workpiece were glossy, regular and blue uniformly.

(5-b) Preparation of Laser-Absorptive Workpiece and (5-c) Manufacture of Laser-Welded Article To begin with, a laser-absorptive film layer was prepared by the following procedures. 400 g of the polypropylene resin of catalog No. BC05B that is available from Japan Polychem Co., Ltd. and 0.8 g of carbon black that is available from Mitsubishi Chemical Corporation were blended. The obtained mixture was executed the molding at 220° C. of temperature of the cylinder and 40° C. of temperature of the metal mold with general procedures. The laser-absorptive resin film layer 8 including carbon black was obtained.

And then, the laser-absorptive film layer 8 was sandwiched between the obtained laser-transmissible workpieces 1 and 7. Irradiating the laser 3 by the same procedure as Example 1, a laser-welded article made of the laser-transmissible workpiece 1 and the laser-absorptive workpiece 2 consisting of the laser-transmissible workpiece 7 and the laser-absorptive film layer 8 was obtained. And they were evaluated by the same physical evaluations as Example 1.

Example 6

(6-a1) Preparation of Laser-Transmissible Workpiece 1

400 g of the polyphenylene sulfide resin of catalog No. 0220A9 that is available from Polyplastics Co., Ltd. and has 350 Pa·s of the melting viscosity 0.80 g of the colorant of Manufacture Example 6

The above compounds were added in the tumbler made of stainless steel, and mixed with stirring for 1 hour. The obtained mixture was executed the injection molding at 320° C. of temperature of the cylinder and 140° C. of temperature of the metal mold with general procedures using the injection molding machine of catalog No. Si-50 that is available from Toyo Machinery & Metal Co., Ltd. As shown in FIG. 1, a laser-transmissible workpiece 1 of a plate that has length of 60 mm, width of 18 mm and thickness of 3 mm with the proviso of the end portion having the stair 4 of the thickness of 1.5 mm and length of 20 mm from the edge by lacking an under side thereof was obtained. The surface and appearance of the laser-transmissible workpiece were glossy, regular and blue uniformly.

(6-a2) Preparation of Laser-Transmissible Workpiece 7

A laser-transmissible workpiece 7 was obtained by the same injection molding as the laser-transmissible workpiece 1 of (6-a1). The surface and appearance of the laser-transmissible workpiece were glossy, regular and blue uniformly.

(6-b) Preparation of Laser-Absorptive Workpiece and (6-c) Manufacture of Laser-Welded Article To begin with, an alcoholic ink for a marking pen including the laser-absorbent as the laser-absorptive ink was prepared by the following procedures.

6 parts by weight of nigrosine base EX of catalog No. C. I. Solvent Black 7 that is available from Orient Chemical Industries, Ltd.

69 parts by weight of ethanol 5 parts by weight of benzyl alcohol 10 parts by weight of oleic acid 10 parts by weight of ketone resin The above compounds were mixed and dissolved at 40° C. homogeneously to prepare the ink. The ink filled the shell of the available marking pen.

And then, the laser-absorptive ink was applied onto the stair of the laser-transmissible workpiece 7 by the pen to prepare an ink-coating layer 9 on the laser-transmissible workpiece 7. Consequently the laser-absorptive workpiece 2 consists of the laser-transmissible workpiece 7 and the ink-coating layer 9. Another laser-transmissible workpiece 1 was put onto the ink-coating layer 9 to pile. Irradiating the laser towards both sides of the workpiece 1 and the workpiece 7 by the same procedure as Example 1, a laser-welded article made of the laser-transmissible workpiece 1 and the laser-absorptive workpiece 2 was obtained. And they were evaluated by the same physical evaluations as Example 1.

Example 7

(7-a) Preparation of Laser-Transmissible Workpiece

The procedure was executed as same as Example 3 except for using colorant in Manufacture Example 7 instead of the colorant in Manufacture Example 3. And a laser-transmissible workpiece 1 was obtained. The surface and appearance of the laser-transmissible workpiece were glossy, regular and black uniformly.

(7-b) Preparation of Laser-Absorptive Workpiece and (7-c) Manufacture of Laser-Welded Article A black laser-absorptive workpiece 2 and a laser-welded article shown in FIG. 1 were obtained by the same procedure as Example 1. And they were evaluated by the same physical evaluations as Example 1.

Example 8

(8-a) Preparation of Laser-Transmissible Workpiece

The procedure was executed as same as Example 3 except for using colorant in Manufacture Example 10 instead of the colorant in Manufacture Example 3. And a laser-transmissible workpiece 1 was obtained. The surface and appearance of the laser-transmissible workpiece were glossy, regular and black uniformly.

(8-b) Preparation of Laser-Absorptive Workpiece and (8-c) Manufacture of Laser-Welded Article A black laser-absorptive workpiece 2 and a laser-welded article shown in FIG. 1 were obtained by the same procedure as Example 1. And they were evaluated by the same physical evaluations as Example 1.

Comparative Example 1

(C1-a) Preparation of Laser-Transmissible Workpiece 400 g of the polyphenylene sulfide resin of catalog No. 0220A9 that is available from Polyplastics Co., Ltd.

0.80 g of the colorant of Comparative Manufacture Example 1

The above compounds were added in the tumbler made of stainless steel, and mixed with stirring for 1 hour. The obtained mixture was executed the injection molding at 320° C. of temperature of the cylinder and 140° C. of temperature of the metal mold with general procedures using the injection molding machine of catalog No. Si-50 that is available from Toyo Machinery & Metal Co., Ltd. A Blue laser-transmissible workpiece 1 having the shape as shown in FIG. 1 was obtained.

(C1-b) Preparation of Laser-Absorptive Workpiece and (C1-c) Manufacture of Laser-Welded Article A black laser-absorptive workpiece 2 and a laser-welded article shown in FIG. 1 were obtained by the same procedure as Example 1. And they were evaluated by the same physical evaluations as Example 1.

Comparative Example 2

(C2-a) Preparation of Laser-Transmissible Workpiece

The procedure was executed as same as Comparative Example 1 except for using colorant in Comparative Manufacture Example 2 instead of the colorant in Comparative Manufacture Example 1. And a blue laser-transmissible workpiece 1 was obtained.

(C2-b) Preparation of Laser-Absorptive Workpiece and (C2-c) Manufacture of Laser-Welded Article A black laser-absorptive workpiece 2 and a laser-welded article shown in FIG. 1 were obtained by the same procedure as Example 1. And they were evaluated by the same physical evaluations as Example 1.

Comparative Example 3

(C3-a) Preparation of Laser-Transmissible Workpiece

The procedure was executed as same as Comparative Example 1 except for using colorant in Comparative Manufacture Example 3 instead of the colorant in Comparative Manufacture Example 1. And a blue laser-transmissible workpiece 1 was obtained.

(C3-b) Preparation of Laser-Absorptive Workpiece and (C3-c) Manufacture of Laser-Welded Article A black laser-absorptive workpiece 2 and a laser-welded article shown in FIG. 1 were obtained by the same procedure as Example 1. And they were evaluated by the same physical evaluations as Example 1.

Comparative Example 4

(C4-a) Preparation of Laser-Transmissible Workpiece

The procedure was executed as same as Comparative Example 1 except for using colorant in Comparative Manufacture Example 4 instead of the colorant in Comparative Manufacture Example 1. And a blue laser-transmissible workpiece 1 was obtained.

(C4-b) Preparation of Laser-Absorptive Workpiece and (C4-c) Manufacture of Laser-Welded Article A black laser-absorptive workpiece 2 and a laser-welded article shown in FIG. 1 were obtained by the same procedure as Example 1. And they were evaluated by the same physical evaluations as Example 1.

Comparative Example 5

(C5-a) Preparation of Laser-Transmissible Workpiece

The procedure was executed as same as Example 3 except for using colorant in Comparative Manufacture Example 5 instead of the colorant in Manufacture Example 3. And a black laser-transmissible workpiece 1 was obtained.

(C5-b) Preparation of Laser-Absorptive Workpiece and (C5-c) Manufacture of Laser-Welded Article A black laser-absorptive workpiece 2 and a laser-welded article shown in FIG. 1 were obtained by the same procedure as Example 1. And they were evaluated by the same physical evaluations as Example 1.

Examples 9 and 10 are embodiments applied the present invention of the laser-welded article prepared as the same size and shape by using the polybutylene terephthalate resin.

Example 9

(9-a) Preparation of Laser-Transmissible Workpiece 400 g of the polybutylene terephthalate resin of catalog No. 5008AS that is available from Mitsubishi Engineering-Plastics Corporation.

0.80 g of the colorant of Manufacture Example 6

The above compounds were added in the tumbler made of stainless steel, and mixed with stirring for 1 hour. The obtained mixture was executed the injection molding at 260° C. of temperature of the cylinder and 80° C. of temperature of the metal mold with general procedures using the injection molding machine of catalog No. Si-50 that is available from Toyo Machinery & Metal Co., Ltd. As shown in FIG. 1, a laser-transmissible workpiece 1 of a plate that has length of 60 mm, width of 18 mm and thickness of 3 mm with the proviso of the end portion having the stair 4 of the thickness of 1.5 mm and length of 20 mm from the edge by lacking an under side thereof was obtained. The surface and appearance of the laser-transmissible workpiece were glossy, regular and green uniformly.

(9-b) Preparation of Laser-Absorptive Workpiece and (9-c) Manufacture of Laser-Welded Article A black laser-absorptive workpiece 2 and a laser-welded article shown in FIG. 1 were prepared by the same procedure as Example 1 except for using the polybutylene terephthalate resin of catalog No. 5008AS that is available from Mitsubishi Engineering-Plastics Corporation instead of the polyphenylene sulfide resin. The injection molding was executed at 260° C. of temperature of the cylinder and 80° C. of temperature of the metal mold. As shown in FIG. 1, a laser-absorptive workpiece 2 of a plate that has length of 60 mm, width of 18 mm and thickness of 3 mm with the proviso of the end portion having the stair 5 of the thickness of 1.5 mm and length of 20 mm from the edge by lacking an upper side thereof was obtained. A laser-welded article was obtained by the same procedure as Example 1 (1-c). And they were evaluated by the same physical evaluations as Example 1.

Example 10

(10-a) Preparation of Laser-Transmissible Workpiece

The procedure was executed as same as Example 9 except for using colorant in Manufacture Example 7 instead of the colorant in Manufacture Example 6. And a laser-transmissible workpiece 1 was obtained. The surface and appearance of the laser-transmissible workpiece were glossy, regular and black uniformly.

(10-b) Preparation of Laser-Absorptive Workpiece and (10-c) Manufacture of Laser-Welded Article A laser-absorptive workpiece and a laser-welded article were obtained by the same procedure as Example 9. And they were evaluated by the same physical evaluations as Example 1.

Examples 11 and 12 are embodiments applied the present invention of the laser-welded article prepared as the same size and shape by using the polyamide 6 resin.

Example 11

(11-a) Preparation of Laser-Transmissible Workpiece 400 g of the polyamide 6 resin of catalog No. 1015GU9 that is available from Ube Industries, Ltd.

0.80 g of the colorant of Manufacture Example 6

The above compounds were added in the tumbler made of stainless steel, and mixed with stirring for 1 hour. The obtained mixture was executed the injection molding at 270° C. of temperature of the cylinder and 80° C. of temperature of the metal mold with general procedures using the injection molding machine of catalog No. Si-50 that is available from Toyo Machinery & Metal Co., Ltd. As shown in FIG. 1, a laser-transmissible workpiece 1 of a plate that has length of 60 mm, width of 18 mm and thickness of 3 mm with the proviso of the end portion having the stair 4 of the thickness of 1.5 mm and length of 20 mm from the edge by lacking an under side thereof was obtained. The surface and appearance of the laser-transmissible workpiece were glossy, regular and green uniformly.

(11-b) Preparation of Laser-Absorptive Workpiece and (11-c) Manufacture of Laser-Welded Article A black laser-absorptive workpiece 2 and a laser-welded article shown in FIG. 1 were prepared by the same procedure as Example 1 except for using the polyamide 6 resin of catalog No. 1015GU9 that is available from Ube Industries, Ltd. instead of the polyphenylene sulfide resin. The injection molding was executed at 270° C. of temperature of the cylinder and 80° C. of temperature of the metal mold. As shown in FIG. 1, a laser-absorptive workpiece 2 of a plate that has length of 60 mm, width of 18 mm and thickness of 3 mm with the proviso of the end portion having the stair 5 of the thickness of 1.5 mm and length of 20 mm from the edge by lacking an upper side thereof was obtained. A laser-welded article was obtained by the same procedure as Example 1 (1-c) except that the scanning speed in the condition of laser welding was changed to 10 mm/sec. And they were evaluated by the same physical evaluations as Example 1.

Example 12

(12-a) Preparation of Laser-Transmissible Workpiece

The procedure was executed as same as Example 11 except for using colorant in Manufacture Example 7 instead of the colorant in Manufacture Example 6. And a laser-transmissible workpiece 1 was obtained. The surface and appearance of the laser-transmissible workpiece were glossy, regular and black uniformly.

(12-b) Preparation of Laser-Absorptive Workpiece and (12-c) Manufacture of Laser-Welded Article A laser-absorptive workpiece and a laser-welded were obtained by the same procedure as Example 11. And they were evaluated by the same physical evaluations as Example 1.

Examples 13 and 14 are embodiments applied the present invention of the laser-welded article prepared as the same size and shape by using the polyacetal resin.

Example 13

(13-a) Preparation of Laser-Transmissible Workpiece 400 g of the polyacetal resin of catalog No. DURACON M90-44 that is available from Polyplastics Co., Ltd.

0.40 g of the colorant of Manufacture Example 2

The above compounds were added in the tumbler made of stainless steel, and mixed with stirring for 1 hour. The obtained mixture was executed the injection molding at 230° C. of temperature of the cylinder and 70° C. of temperature of the metal mold with general procedures using the injection molding machine of catalog No. Si-50 that is available from Toyo Machinery & Metal Co., Ltd. As shown in FIG. 1, a laser-transmissible workpiece 1 of a plate that has length of 60 mm, width of 18 mm and thickness of 3 mm with the proviso of the end portion having the stair 4 of the thickness of 1.5 mm and length of 20 mm from the edge by lacking an under side thereof was obtained. The surface and appearance of the laser-transmissible workpiece were glossy, regular and blue uniformly.

(13-b) Preparation of Laser-Absorptive Workpiece and (13-c) Manufacture of Laser-Welded Article A black laser-absorptive workpiece 2 and a laser-welded article shown in FIG. 1 were prepared by the same procedure as Example 1 except for using the polyacetal resin of catalog No. DURACON M90-44 that is available from Polyplastics Co., Ltd. instead of the polyphenylene sulfide resin. The injection molding was executed at 230° C. of temperature of the cylinder and 70° C. of temperature of the metal mold. As shown in FIG. 1, a laser-absorptive workpiece 2 of a plate that has length of 60 mm, width of 18 mm and thickness of 3 mm with the proviso of the end portion having the stair 5 of the thickness of 1.5 mm and length of 20 mm from the edge by lacking an upper side thereof was obtained. A laser-welded article was obtained by the same procedure as Example 1 (1-c) except that the scanning speed in the condition of laser welding was changed to 8 mm/sec. And they were evaluated by the same physical evaluations as Example 1.

Example 14

(14-a) Preparation of Laser-Transmissible Workpiece 900 g of the polyacetal resin of catalog No. DURACON M90-44 that is available from Polyplastics Co., Ltd.

100 g of the colorant of Manufacture Example 3

The above compounds were added in the tumbler made of stainless steel, and mixed with stirring for 1 hour. The obtained mixture was kneaded and melted at 230° C. of temperature of the cylinder using the single screw extruder of catalog No. E30SV that is available from ENPLA Industry Co. Then it was cooled in a water tank, and cut by the pelletizer. Through the drying procedure, black masterbatch including 10 weight % of concentration of the colorant was obtained.

475 g of the polyacetal resin of catalog No. DURACON M90-44 that is available from Polyplastics Co., Ltd.

25 g of the black masterbatch

The above compounds were added in the tumbler made of stainless steel, and mixed with stirring for 1 hour. The obtained mixture was executed the injection molding at 230° C. of temperature of the cylinder and 70° C. of temperature of the metal mold with general procedures using the injection molding machine of catalog No. Si-50 that is available from Toyo Machinery & Metal Co., Ltd. A laser-transmissible workpiece 1 having the shape shown in FIG. 1 was obtained by the same injection molding as Example 13. The surface and appearance of the laser-transmissible workpiece were glossy, regular and black uniformly.

(14-b) Preparation of Laser-Absorptive Workpiece and (14-c) Manufacture of Laser-Welded Article A laser-absorptive workpiece and a laser-welded article were obtained by the same procedure as Example 13. And they were evaluated by the same physical evaluations as Example 1.

Examples 15 and 16 are embodiments applied the present invention of the laser-welded article prepared as the same size and shape by using the polysulfone-type resin.

Example 15

(15-a) Preparation of Laser-Transmissible Workpiece 400 g of the polysulfone-type resin of catalog No. UDEL P-1700NT11 that is available from Solvay Advanced Polymers K. K 0.40 g of the colorant of Manufacture Example 2

The above compounds were added in the tumbler made of stainless steel, and mixed with stirring for 1 hour. The obtained mixture was executed the injection molding at 340° C. of temperature of the cylinder and 150° C. of temperature of the metal mold with general procedures using the injection molding machine of catalog No. Si-50 that is available from Toyo Machinery & Metal Co., Ltd. As shown in FIG. 1, a laser-transmissible workpiece 1 of a plate that has length of 60 mm, width of 18 mm and thickness of 3 mm with the proviso of the end portion having the stair 4 of the thickness of 1.5 mm and length of 20 mm from the edge by lacking an under side thereof was obtained. The surface and appearance of the laser-transmissible workpiece were glossy, regular and blue uniformly.

(15-b) Preparation of Laser-Absorptive Workpiece and (15-c) Manufacture of Laser-Welded Article A black laser-absorptive workpiece 2 and a laser-welded article shown in FIG. 1 were prepared by the same procedure as Example 1 except for using the polysulfone-type resin of catalog No. UDEL P-1700NT11 that is available from Solvay Advanced Polymers K. K instead of the polyphenylene sulfide resin. The injection molding was executed at 340° C. of temperature of the cylinder and 150° C. of temperature of the metal mold. As shown in FIG. 1, a laser-absorptive workpiece 2 of a plate that has length of 60 mm, width of 18 mm and thickness of 3 mm with the proviso of the end portion having the stair 5 of the thickness of 1.5 mm and length of 20 mm from the edge by lacking an upper side thereof was obtained.

A laser-welded article was obtained by the same procedure as Example 1 (1-c) except that the scanning speed in the condition of laser welding was changed to 60 mm/sec. And they were evaluated by the same physical evaluations as Example 1.

Example 16

(16-a) Preparation of Laser-Transmissible Workpiece 900 g of the polysulfone-type resin of catalog No. UDEL P-1700NT11 that is available from Solvay Advanced Polymers K. K
100 g of the colorant of Manufacture Example 3
The above compounds were added in the tumbler made of stainless steel, and mixed with stirring for 1 hour. The obtained mixture was kneaded and melted at 340° C. of temperature of the cylinder using the single screw extruder of catalog No. E30SV that is available from ENPLA Industry Co. Then it was cooled in a water tank, and cut by the pelletizer. Through the drying procedure, black masterbatch including 10 weight % of concentration of the colorant was obtained.
490 g of the polysulfone-type resin of catalog No. UDEL P-1700NT11 that is available from Solvay Advanced Polymers K. K
10 g of the black masterbatch
The above compounds were added in the tumbler made of stainless steel, and mixed with stirring for 1 hour. The obtained mixture was executed the injection molding at 340° C. of temperature of the cylinder and 150° C. of temperature of the metal mold with general procedures using the injection molding machine of catalog No. Si-50 that is available from Toyo Machinery & Metal Co., Ltd. A laser-transmissible workpiece 1 having the shape shown in FIG. 1 was obtained by the same injection molding as Example 15. The surface and appearance of the laser-transmissible workpiece were glossy, regular and black uniformly.

(16-b) Preparation of Laser-Absorptive Workpiece and (16-c) Manufacture of Laser-Welded Article A laser-absorptive workpiece and a laser-welded article were obtained by the same procedure as Example 15. And they were evaluated by the same physical evaluations as Example 1.

Examples 17 to 20 and Comparative Examples 6 to 7 are embodiments applied the present invention of the laser-welded article prepared as the same size and shape by using the polyether sulfone resin.

Example 17

(17-a) Preparation of Laser-Transmissible Workpiece 400 g of the polyether sulfone resin of catalog No. REDEL A-300ANT that is available from Solvay Advanced Polymers K. K.
0.40 g of the colorant of Manufacture Example 9
The above compounds were added in the tumbler made of stainless steel, and mixed with stirring for 1 hour. The obtained mixture was executed the injection molding at 360° C. of temperature of the cylinder and 150° C. of temperature of the metal mold with general procedures using the injection molding machine of catalog No. Si-50 that is available from Toyo Machinery & Metal Co., Ltd. As shown in FIG. 1, a laser-transmissible workpiece 1 of a plate that has length of 60 mm, width of 18 mm and thickness of 3 mm with the proviso of the end portion having the stair 4 of the thickness of 1.5 mm and length of 20 mm from the edge by lacking an under side thereof was obtained. The surface and appearance of the laser-transmissible workpiece were glossy, regular and blue uniformly.

(17-b) Preparation of Laser-Absorptive Workpiece and (17-c) Manufacture of Laser-Welded Article A black laser-absorptive workpiece 2 and a laser-welded article shown in FIG. 1 were prepared by the same procedure as Example 1 except for using the polyether sulfone resin of catalog No. REDEL A-300ANT that is available from Solvay Advanced Polymers K. K instead of the polyphenylene sulfide resin. The injection molding was executed at 360° C. of temperature of the cylinder and 150° C. of temperature of the metal mold. As shown in FIG. 1, a laser-absorptive workpiece 2 of a plate that has length of 60 mm, width of 18 mm and thickness of 3 mm with the proviso of the end portion having the stair 5 of the thickness of 1.5 mm and length of 20 mm from the edge by lacking an upper side thereof was obtained. A laser-welded article was obtained by the same procedure as Example 1 (1-c) except that the scanning speed in the condition of laser welding was changed to 50 mm/sec. And they were evaluated by the same physical evaluations as Example 1.

Example 18

(18-a) Preparation of Laser-Transmissible Workpiece

The procedure was executed as same as Example 17 except for using colorant in Manufacture Example 11 instead of the colorant in Manufacture Example 9. And a laser-transmissible workpiece 1 was obtained. The surface and appearance of the laser-transmissible workpiece were glossy, regular and black uniformly.

(18-b) Preparation of Laser-Absorptive Workpiece and (18-c) Manufacture of Laser-Welded Article A laser-absorptive workpiece and a laser-welded article were obtained by the same procedure as Example 17. And they were evaluated by the same physical evaluations as Example 1.

Example 19

(19-a) Preparation of Laser-Transmissible Workpiece

The procedure was executed as same as Example 17 except for using colorant in Manufacture Example 8 instead of the colorant in Manufacture Example 9. And a laser-transmissible workpiece 1 was obtained. The surface and appearance of the laser-transmissible workpiece were glossy, regular and blue uniformly.

(19-b) Preparation of Laser-Absorptive Workpiece and (19-c) Manufacture of Laser-Welded Article A laser-absorptive workpiece and a laser-welded article were obtained by the same procedure as Example 17. And they were evaluated by the same physical evaluations as Example 1.

Example 20

(20-a) Preparation of Laser-Transmissible Workpiece

The procedure was executed as same as Example 17 except for using colorant in Manufacture Example 10 instead of the colorant in Manufacture Example 9. And a laser-transmissible workpiece 1 was obtained. The surface and appearance of the laser-transmissible workpiece were glossy, regular and black uniformly.

(20-b) Preparation of Laser-Absorptive Workpiece and (20-c) Manufacture of Laser-Welded Article A laser-absorptive workpiece and a laser-welded article were obtained by the same procedure as Example 17. And they were evaluated by the same physical evaluations as Example 1.

Comparative Example 6

(C6-a) Preparation of Laser-Transmissible Workpiece 400 g of the polyether sulfone resin of catalog No. REDEL A-300ANT that is available from Solvay Advanced Polymers K. K.
0.40 g of the colorant of Comparative Manufacture Example 6
The above compounds were added in the tumbler made of stainless steel, and mixed with stirring for 1 hour. The obtained mixture was executed the injection molding at 360° C. of temperature of the cylinder and 150° C. of temperature of the metal mold with general procedures using the injection molding machine of catalog No. Si-50 that is available from Toyo Machinery & Metal Co., Ltd. A violet laser-transmissible workpiece 1 having the shape shown in FIG. 1 and Example 17 was obtained by the same injection molding.

(C6-b) Preparation of Laser-Absorptive Workpiece and (C6-c) Manufacture of Laser-Welded Article A black laser-absorptive workpiece 2 and a laser-welded article shown in FIG. 1 were obtained by the same procedure as Example 17. And they were evaluated by the same physical evaluations as Example 1.

Comparative Example 7

(C7-a) Preparation of Laser-Transmissible Workpiece

The procedure was executed as same as Comparative Example 6 except for using colorant in Comparative Manufacture Example 7 instead of the colorant in Comparative Manufacture Example 6. And a blue laser-transmissible workpiece 1 was obtained.

(C7-b) Preparation of Laser-Absorptive Workpiece and (C7-c) Manufacture of Laser-Welded Article A black laser-absorptive workpiece 2 and a laser-welded article shown in FIG. 1 were obtained by the same procedure as Example 17. And they were evaluated by the same physical evaluations as Example 1.

The results of the physical evaluations of the laser-transmissible workpieces and the laser-welded articles of Examples 1 to 20 and Comparative Examples 1 to 7 are shown in Tables 3 and 4.

TABLE 3

| | | Physical Evaluation of Laser-transmissible Workpiece | | | | |
|---|---|---|---|---|---|---|
| | | (1) Determination Test of Transmissivity: Transmissivtty (%) | (2) Heat Resistance Test: Color Difference | (3) Heat Resistance Test: Transmissivtty (%) | (4) Heat-retrogradation Resistance Test: Color Difference | (5) Sublimation Resistance Test |
| Resin | Example | | | | | |
| PPS Resin | PPS Resin | 21 | — | 21 | — | — |
| | Example 1 | 19 | 0.8 | 17 | 0.9 | Excellent |
| | Example 2 | 18 | 0.4 | 17 | 0.5 | Excellent |
| | Example 3 | 18 | 0.3 | 16 | 0.3 | Excellent |
| | Example 4 | 18 | 0.5 | 18 | 0.4 | Excellent |
| | Example 5 | 18 | 0.6 | 16 | 0.7 | Excellent |
| | Example 6 | 18 | 0.2 | 17 | 0.4 | Excellent |
| | Example 7 | 18 | 0.9 | 17 | 0.9 | Excellent |
| | Example 8 | 18 | 0.8 | 17 | 0.7 | Excellent |
| | Comparative Example 1 | 16 | 2.5 | 9 | 3.2 | Excellent |
| | Comparative Example 2 | 15 | 1.9 | 10 | 2.1 | Excellent |
| | Comparative Example 3 | 16 | 1.6 | 9 | 2.5 | Excellent |

TABLE 3-continued

| | | Physical Evaluation of Laser-transmissible Workpiece | | | | |
|---|---|---|---|---|---|---|
| Resin | Example | (1) Determination Test of Transmissivity: Transmissivtty (%) | (2) Heat Resistance Test: Color Difference | (3) Heat Resistance Test: Transmissivity (%) | (4) Heat-retrogradation Resistance Test: Color Difference | (5) Sublimation Resistance Test |
| | Comparative Example 4 | 16 | 1.5 | 10 | 2.8 | Excellent |
| | Comparative Example 5 | 18 | 1.3 | 15 | 2.3 | Failure |
| PBT Resin | PBT Resin | 20 | — | 19 | — | — |
| | Example 9 | 16 | 0.7 | 16 | 0.6 | Excellent |
| | Example 10 | 16 | 0.6 | 15 | 0.5 | Excellent |
| PA6 Resin | PA6 Resin | 63 | — | 62 | — | — |
| | Example 11 | 60 | 0.6 | 58 | 0.5 | Excellent |
| | Example 12 | 58 | 0.3 | 55 | 0.4 | Excellent |
| POM Resin | POM Resin | 45 | — | 45 | — | — |
| | Example 13 | 40 | 0.5 | 39 | 0.3 | Excellent |
| | Example 14 | 38 | 0.4 | 36 | 0.2 | Excellent |
| PSU Resin | PSU Resin | 89 | — | 89 | — | — |
| | Example 15 | 83 | 0.7 | 84 | 0.2 | Excellent |
| | Example 16 | 83 | 0.6 | 82 | 0.2 | Excellent |
| PES Resin | PES Resin | 89 | — | 89 | — | — |
| | Example 17 | 74 | 0.4 | 76 | 0.2 | Excellent |
| | Example 18 | 73 | 0.3 | 73 | 0.5 | Excellent |
| | Example 19 | 74 | 0.5 | 78 | 0.3 | Excellent |
| | Example 20 | 73 | 0.4 | 74 | 0.3 | Excellent |
| | Comparative Example 6 | 72 | 0.6 | 71 | 0.7 | Failure |
| | Comparative Example 7 | 71 | 0.6 | 70 | 0.6 | Failure |

TABLE 4

| | | | Physical Evaluation of Laser-welded Article | |
|---|---|---|---|---|
| Resin | Example | Condition of Laser Welding | (6) Visual Observation of Appearance | (7) Tensile Strength Test (MPa) |
| PPS Resin | PPS Resin | Output Power: 30 W Scanning Speed: 4 mm/sec. | — | — |
| | Example 1 | | Excellent | 32.3 |
| | Example 2 | | Excellent | 30.5 |
| | Example 3 | | Excellent | 32.3 |
| | Example 4 | | Excellent | 31.7 |
| | Example 5 | | Excellent | 22.6 |
| | Example 6 | | Excellent | 21.1 |
| | Example 7 | | Excellent | 29.7 |
| | Example 8 | | Excellent | 30.7 |
| | Comparative Example 1 | | Flaws on Surface | 28.1 |
| | Comparative Example 2 | | Flaws on Surface | 29.5 |
| | Comparative Example 3 | | Flaws on Surface | 26.2 |
| | Comparative Example 4 | | Flaws on Surface | 29.6 |
| | Comparative Example 5 | | Flaws on Surface | 27.0 |
| PBT Resin | PBT Resin | Output Power: 30 W Scaning Speed 4 mm/sec. | — | — |
| | Example 9 | | Excellent | 23.8 |
| | Example 10 | | Excellent | 21.3 |
| PA6 Resin | PA6 Resin | Output Power: 30 W Scaning Speed 10 mm/sec. | — | — |
| | Example 11 | | Excellent | 47.1 |
| | Example 12 | | Excellent | 46.5 |
| POM Resin | POM Resin | Output Power: 30 W Scaning Speed 8 mm/sec. | — | — |
| | Example 13 | | Excellent | 24.5 |
| | Example 14 | | Excellent | 24.2 |
| PSU Resin | PSU Resin | Output Power: 30 W Scaning Speed 60 mm/sec. | — | — |
| | Example 15 | | Excellent | 27.1 |
| | Example 16 | | Excellent | 26.6 |
| PES Resin | PES Resin | Output Power: 30 W Scaning Speed 50 mm/sec. | — | — |
| | Example 17 | | Excellent | 28.3 |
| | Example 18 | | Excellent | 26.5 |
| | Example 19 | | Excellent | 26.6 |
| | Example 20 | | Excellent | 24.3 |
| | Comparative Example 6 | | Excellent | 23.5 |
| | Comparative Example 7 | | Excellent | 23.0 |

It is evident with Tables 3 and 4 that the transmissivity, the heat resistance, the heat stability and the sublimation resistance of the laser-transmissible colored resin compositions applying the present invention or the laser-transmissible workpieces of the Examples made from the compositions are all excellent. And the laser welding appearance and the tensile strength of the laser-welded articles applying the present invention are both excellent.

The invention claimed is:

1. A laser-welded article comprising:
a laser-transmissible workpiece made from a laser-transmissible colored resin composition including at least an alkaline earth metal salt of an anthraquinone acidic dye and a thermoplastic resin,
and a laser-absorptive workpiece put together with the laser-transmissible workpiece,
wherein the workpieces are welded at a put position thereof by irradiated laser towards the laser-transmissible workpiece that transmits therethrough and is absorbed into the laser-absorptive workpiece.

2. The laser-welded article according to claim 1, wherein the alkaline earth metal salt of the anthraquinone acidic dye is represented by the following chemical formula (1)

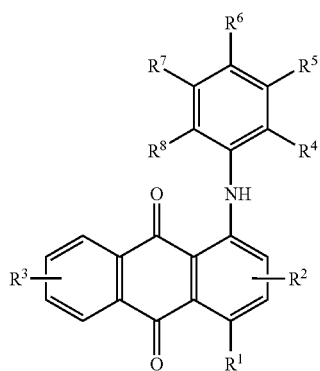

where, in the chemical formula (1),
R$^1$ is selected from the group consisting of a hydrogen atom, a hydroxyl group, an amino group, an alkylamino group, and an acylamino group,
R$^2$ is selected from the group consisting of a hydrogen atom, an alkyl group, a halogen group, an alkoxyl group and SO$_3$M$_{1/2}$ that M is an alkaline earth metal,
R$^3$ is same or different to R$^2$, and is selected from the group consisting of a hydrogen atom, an alkyl group, a halogen group, an alkoxyl group and SO$_3$M$_{1/2}$ that M is an alkaline earth metal, and an anilino group having no substitutional groups or substitutional groups of an alkyl group, a halogen group, an amino group, a nitro group and SO$_3$M$_{1/2}$ that M is an alkaline earth metal,
R$^4$, R$^5$, R$^6$, R$^7$ and R$^8$ are same or different to each other, and are selected from the group consisting of a hydrogen atom, an alkyl group, an amino group, a nitro group, an acyl group, an acylamino group, an acyl-N-alkylamino group, a halogen group, an alkoxyl group and SO$_3$M$_{1/2}$ that M is an alkaline earth metal, and
at least one of R$^2$, R$^3$, R$^4$, R$^5$, R$^6$, R$^7$ and R$^8$ is SO$_3$M$_{1/2}$, and/or the following chemical formula (2)

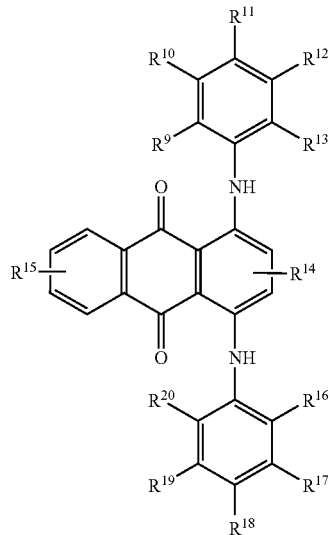

where, in the chemical formula (2),
R$^{14}$ and R$^{15}$ are same or different to each other, and are selected from the group consisting of a hydrogen atom, an alkyl group, a halogen group, an alkoxyl group an amino group, a nitro group, and SO$_3$M$_{1/2}$ that M is an alkaline earth metal,
R$^9$, R$^{10}$, R$^{11}$, R$^{12}$, R$^{13}$, R$^{16}$, R$^{17}$, R$^{18}$, R$^{19}$, and R$^{20}$ are same or different to each other, and are selected from the group consisting of a hydrogen atom, an alkyl group, an acyl group, an acylamino group, an acyl-N-alkylamino group, a halogen group, an alkoxyl group and SO$_3$M$_{1/2}$ that M is an alkaline earth metal, and
at least one of R$^9$, R$^{10}$, R$^{11}$, R$^{12}$, R$^{13}$, R$^{14}$, R$^{15}$, R$^{16}$, R$^{17}$, R$^{18}$, R$^{19}$, and R$^{20}$ is SO$_3$M$_{1/2}$.

3. The laser-welded article according to claim 1, wherein the thermoplastic resin is at least one selected from the group consisting of polyphenylene sulfide resin, polyester resin, polyolefin resin, polyamide resin, polyacetal resin, and polysulfone resin.

4. The laser-welded article according to claim 1, wherein the thermoplastic resin is polyphenylene sulfide resin.

5. The laser-welded article according to claim 1, wherein the laser-absorptive workpiece is made from a laser-absorptive colored resin composition.

6. The laser-welded article according to claim 1, wherein the laser-absorptive workpiece comprising of a film layer including a laser-absorbent or a coating layer including a laser-absorbent is intervened between the laser-transmissible workpiece and another laser-transmissible workpiece.

7. The laser-welded article according to claim 1, wherein the laser-absorptive workpiece includes a laser-absorbent comprising at least carbon black.

8. The laser-welded article according to claim 1, wherein the laser furnishes an energy quantity x(J/mm) that is satisfied the following numerical expression $$5.0 \geq x = (p \times T) \div (100 \times q) \geq 0.4$$

in the numerical expression, p(W) is output power of the laser, q(mm/sec.) is scanning speed of the laser, T is transmissivity of the laser-transmissible workpiece under wavelength of the laser, which has tensile stress strength ranging from 20 to 60 MPa in accordance with a tensile stress test of Japanese Industrial Standard K-7113-1995.

9. A method for laser welding comprising:

putting a laser-transmissible workpiece made from a laser-transmissible colored resin composition including an alkaline earth metal salt of an anthraquinone acidic dye and a thermoplastic resin onto a laser-absorptive workpiece, irradiating laser while scanning towards the laser-transmissible workpiece, and welding the laser-transmissible workpiece and the laser-absorptive workpiece at a put portion thereof together by the laser that transmits through the laser-transmissible workpiece and is absorbed into the laser-absorptive workpiece, wherein the laser furnishes an energy quantity x(J/mm) that is satisfied the following numerical expression $5.0 \geq x = (p \times T) \div (100 \times q) \geq 0.4$ in the numerical expression, p(W) is output power of the laser, q(mm/sec.) is scanning speed of the laser, T is transmissivity of the laser-transmissible workpiece under wavelength of the laser.

10. The method for the laser welding according to claim 9, wherein the alkaline earth metal salt of the anthraquinone acidic dye is represented by the following chemical formula (1)

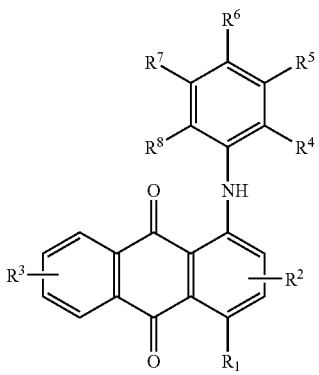

where, in the chemical formula (1), $R^1$ is selected from the group consisting of a hydrogen atom, a hydroxyl group, an amino group, an alkylamino group, and an acylamino group, $R^2$ is selected from the group consisting of a hydrogen atom, an alkyl group, a halogen group, an alkoxyl group and $SO_3M_{1/2}$ that M is an alkaline earth metal, $R^3$ is same or different to $R^2$, and is selected from the group consisting of a hydrogen atom, an alkyl group, a halogen group, an alkoxyl group and $SO_3M_{1/2}$ that M is an alkaline earth metal, and an anilino group having no substitutional groups or substitutional groups of an alkyl group, a halogen group, an amino group, a nitro group and $SO_3M_{1/2}$ that M is an alkaline earth metal, $R^4$, $R^5$, $R^6$, $R^7$ and $R^8$ are same or different to each other, and are selected from the group consisting of a hydrogen atom, an alkyl group, an amino group, a nitro group, an acyl group, an acylamino group, an acyl-N-alkylamino group, a halogen group, an alkoxyl group and $SO_3M_{1/2}$ that M is an alkaline earth metal, and at least one of $R^2$, $R^3$, $R^4$, $R^5$, $R^6$, $R^7$ and $R^8$ is $SO_3M_{1/2}$ and/or the following chemical formula (2)

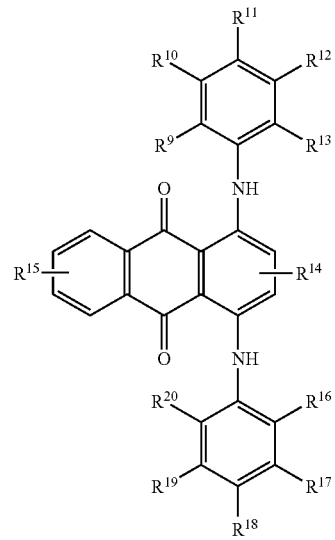

where, in the chemical formula (2), $R^{14}$ and $R^{15}$ are same or different to each other, and are selected from the group consisting of a hydrogen atom, an alkyl group, a halogen group, an alkoxyl group an amino group, a nitro group, and $SO_3M_{1/2}$ that M is an alkaline earth metal, $R^9$, $R^{10}$, $R^{11}$, $R^{12}$, $R^{13}$, $R^{16}$, $R^{17}$, $R^{18}$, $R^{19}$, and $R^{20}$ are same or different to each other, and are selected from the group consisting of a hydrogen atom, an alkyl group, an acyl group, an acylamino group, an acyl-N-alkylamino group, a halogen group, an alkoxyl group and $SO_3M_{1/2}$ that M is an alkaline earth metal, and at least one of $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ is $SO_3M_{1/2}$.

11. The method for the laser welding according to claim 9, wherein the irradiating laser while scanning towards the laser-transmissible workpiece is simultaneous or successive with irradiating another laser while scanning towards the laser-absorptive workpiece.

* * * * *